United States Patent
Richardson et al.

(10) Patent No.: US 11,662,016 B1
(45) Date of Patent: May 30, 2023

(54) TRANSMISSION PUMP ADAPTER MANIFOLD FOR HYDROSTATIC TRANSMISSION

(71) Applicant: Parker-Hannifin Corporation, Cleveland, OH (US)

(72) Inventors: Jason S. Richardson, Chuckey, TN (US); Kenneth D. Edwards, Seymour, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 191 days.

(21) Appl. No.: 17/205,255

(22) Filed: Mar. 18, 2021

Related U.S. Application Data

(60) Provisional application No. 62/993,333, filed on Mar. 23, 2020.

(51) Int. Cl.
*F16H 61/00* (2006.01)
*B60K 17/10* (2006.01)
*F16H 57/04* (2010.01)

(52) U.S. Cl.
CPC ......... *F16H 61/0009* (2013.01); *B60K 17/10* (2013.01); *F16H 57/0404* (2013.01)

(58) Field of Classification Search
CPC ...... F16H 61/0009; F16H 39/02; F16H 39/04; F16H 39/42; F16H 57/0404; B60K 17/10; F04B 17/06
See application file for complete search history.

(56) References Cited

U.S. PATENT DOCUMENTS

| 3,975,990 | A | * | 8/1976 | Kraus | F16H 39/02 |
| | | | | | 91/499 |
| 4,129,192 | A | * | 12/1978 | Todeschini | B62D 11/18 |
| | | | | | 60/486 |
| 7,040,092 | B1 | | 5/2006 | Buescher | |
| 8,112,991 | B1 | | 2/2012 | Iida et al. | |
| 9,114,703 | B1 | | 8/2015 | Bennett et al. | |
| 10,859,148 | B1 | * | 12/2020 | Richardson | F04B 17/06 |

(Continued)

FOREIGN PATENT DOCUMENTS

CN 106089851 11/2016
EP 1258382 11/2002

*Primary Examiner* — Daniel D Yabut
(74) *Attorney, Agent, or Firm* — Renner, Otto, Boisselle & Sklar, LLP

(57) ABSTRACT

A hydrostatic transmission subassembly for a vehicle includes an adapter manifold and a hydraulic pump mounted to the adapter manifold. The pump includes a pump housing and a pump porting manifold including pump porting for communicating fluid to and from the pump. The adapter manifold may include a mounting section adapted for mounting to the vehicle and a fluid interface section extending from the mounting section. The fluid interface section includes a pump interface having pump interface porting, in which the pump interface engages with the pump porting manifold to fluidly connect the pump interface porting with the pump porting. When the mounting manifold is mounted to the vehicle via the mounting section, the mounting manifold supports the hydraulic pump. The fluid interface section also includes a motor interface having motor interface porting for fluidly connecting to a motor, which enables the mounting manifold to fluidly connect the pump and motor.

19 Claims, 18 Drawing Sheets

(56) References Cited

U.S. PATENT DOCUMENTS

| | | | | |
|---|---|---|---|---|
| 2007/0137918 A1* | 6/2007 | Dong | ................. | B60K 17/10 |
| | | | | 180/305 |
| 2014/0367180 A1* | 12/2014 | Richardson | ............ | F04B 17/06 |
| | | | | 180/6.48 |
| 2018/0216731 A1* | 8/2018 | Richardson | ............ | F04B 1/324 |

* cited by examiner

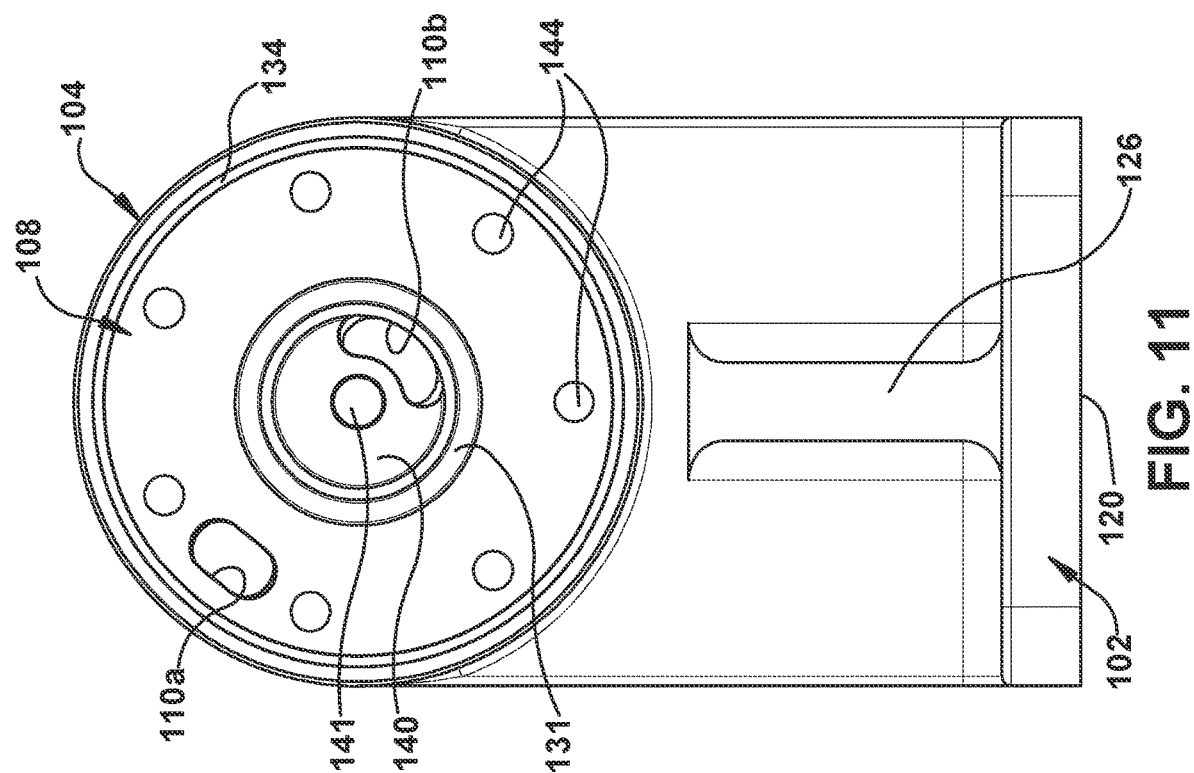
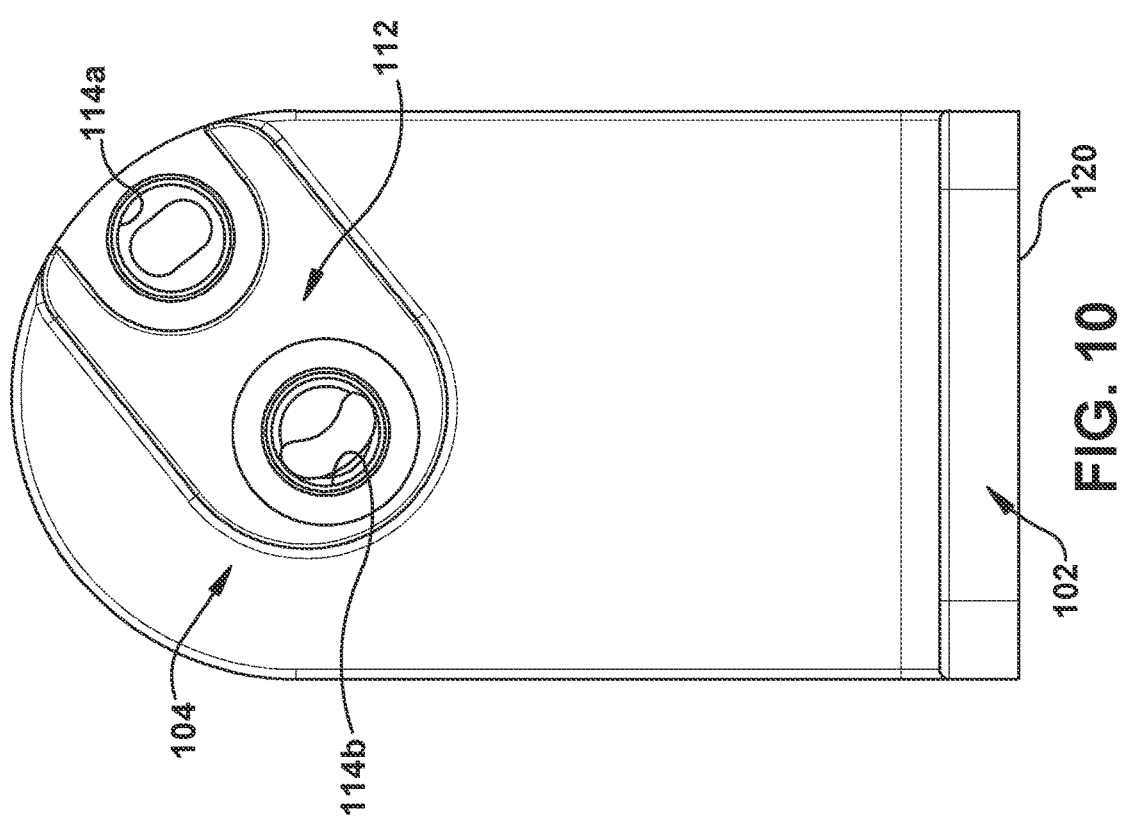

TRANSMISSION PUMP ADAPTER MANIFOLD FOR HYDROSTATIC TRANSMISSION

RELATED APPLICATIONS

This application claims the benefit of U.S. Provisional Application No. 62/993,333 filed Mar. 23, 2020, which is hereby incorporated herein by reference in its entirety.

FIELD OF INVENTION

The present invention relates generally to transmissions, and more particularly to an adapter manifold for a hydrostatic transmission that enables mounting of the transmission pump separately from the motor, and provides a fluid connection between the transmission pump and hydraulic motor for flow of hydraulic fluid.

BACKGROUND

A prime mover, such as an internal combustion engine or the like, can be connected to a hydrostatic transmission. A hydrostatic transmission is particularly suitable to provide traction drive for a light vehicle, such as turf machines, lawn tractors, ride-on lawn mowers, and like devices. A hydrostatic transmission may be connected to a variety of gearboxes and transaxles, so the same components can be utilized on a wide variety of light vehicle models. A simple usage of hydrostatic transmissions is on zero-turn radius vehicles, including zero-turn radius mowers and tractors.

Generally, a hydrostatic transmission includes a hydraulic pump and a hydraulic motor. The hydraulic pump usually is a piston-type pump including a plurality of reciprocating pistons which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor, which allows the transmission output speed to be varied and controlled. The rotation of the hydraulic motor may be used to drive an output shaft, which in turn ultimately drives a wheel axle of a light vehicle of the types described above.

SUMMARY OF INVENTION

Some conventional designs for hydrostatic transmissions integrate components of the pump with components of the motor. For example, some current hydrostatic transmissions have a pump housing connected to a pump end block, in which a portion of the end block serves as a porting manifold that is integral with an end cover of the motor housing. In such a design, the motor is physically coupled to the pump via the end cover and porting manifold in such a way that mounting of the motor supports the transmission pump. Such integral designs may limit the ability to interchange components across multiple different hydrostatic transmission configurations. Therefore, it may be desirable to provide a more modular design in which the motor is mounted separate from the pump, which can improve flexibility of usage with different types of light vehicle configurations.

An aspect of the present disclosure provides a unique hydrostatic transmission, and more particularly a unique adapter manifold for a hydrostatic transmission that enables mounting of the transmission pump separately from the motor, and which includes suitable porting and fluid passages for providing a fluid connection between the transmission pump and a separately mounted hydraulic motor for communicating flow of hydraulic fluid in the transmission.

In some exemplary embodiments, the adapter manifold is a mounting manifold that is mounted to the vehicle for supporting the transmission pump separately from the motor, and which the mounting manifold provides a fluid connection between the transmission pump and hydraulic motor.

In other exemplary embodiments, the adapter manifold enables the pump to be mounted and self-supported on the vehicle separately from the motor, and which the adapter manifold provides a fluid connection between the transmission pump and separately mounted hydraulic motor.

According to an aspect of the present disclosure, a hydrostatic transmission subassembly for a vehicle includes: a hydraulic pump assembly having: a pump housing, and a pump porting manifold including a pump porting interface having pump porting for communicating fluid to and from the hydraulic pump assembly; a mounting manifold having: a mounting section adapted for mounting to the vehicle; a fluid interface section extending from the mounting section, the fluid interface section including a pump interface having pump interface porting, and a motor interface having motor interface porting; and one or more fluid passages extending between the pump interface porting and the motor interface porting for communicating fluid therebetween; wherein the pump interface of the mounting manifold engages with the pump porting interface of the pump porting manifold, such that the pump interface porting is fluidly connected to the pump porting; and wherein, when the mounting manifold is mounted to the vehicle via the mounting section, the mounting manifold supports the hydraulic pump assembly.

According to another aspect of the present disclosure, a mounting manifold for use in a hydrostatic transmission of a vehicle, the mounting manifold comprising: a mounting section having fastening receivers and a mounting interface for mounting the mounting manifold to the vehicle; and a fluid interface section extending from the mounting section; the fluid interface section including a pump interface having first and second interface ports, a motor interface having first and second motor interface ports, and first and second fluid passages respectively fluidly connecting the first and second motor interface ports to the respective first and second pump interface ports; the pump interface having a first face groove and a first seal disposed in the first face groove, the first face groove and first seal being configured to fluidly separate the first pump interface port from the second pump interface port when in use; the pump interface having a second face groove and a second seal disposed in the second face groove for enabling sealing engagement with a pump porting interface of a hydraulic pump assembly of the hydrostatic transmission; and wherein the mounting manifold includes a plurality of fastening receivers that are configured to receive corresponding fasteners for mounting the hydraulic pump assembly to the mounting manifold, the mounting manifold being configured such that, when mounted to the vehicle, the mounting manifold supports the hydraulic pump assembly.

According to another aspect of the present disclosure, a method of assembling a hydrostatic transmission to a vehicle includes: (i) mounting a hydraulic pump assembly to a mounting manifold, wherein: the hydraulic pump assembly includes a pump housing, and a porting manifold including a pump porting interface having pump porting for communicating fluid to and from the hydraulic pump; and the mounting manifold includes: a mounting section adapted for mounting to the vehicle; a fluid interface section extending from the mounting section, the fluid interface section including a pump interface having pump interface porting, and a motor interface having motor interface porting; and one or more fluid passages extending between the pump interface porting and the motor interface porting for communicating fluid therebetween; the pump interface of the mounting manifold engages with the pump porting interface of the pump porting manifold, such that the pump interface porting is fluidly connected to the pump porting; and (ii) mounting the mounting manifold to the vehicle via the mounting section, such that the mounting manifold supports the hydraulic pump assembly.

According to another aspect of the present disclosure, the method may further include: (iii) mounting a hydraulic motor to a different portion of the vehicle separate from mounting manifold; and (iv) fluidly connecting the hydraulic motor to the motor interface porting of the mounting manifold via one or more fluid conduits.

According to another aspect of the present disclosure, a hydrostatic transmission subassembly for a vehicle includes: a hydraulic pump assembly having: a pump housing including a top housing cover and an endblock coupled to a bottom of the top housing cover, and a pump porting manifold extending from the endblock, the pump porting manifold including a pump porting interface having pump porting for communicating fluid to and from the hydraulic pump assembly; and an adapter manifold connected to the pump porting manifold, the adapter manifold having: a pump interface section having pump interface porting, the pump interface section engaging with the pump porting interface of the pump porting manifold, such that the pump interface porting is fluidly connected to the pump porting; a motor interface section having motor interface porting for being fluidly connected to a hydraulic motor; and one or more fluid passages extending between the pump interface porting and the motor interface porting for communicating fluid between the hydraulic pump assembly and the hydraulic motor; wherein the endblock of the hydraulic pump assembly includes integrated mounting studs that are configured to secure the endblock to the top housing cover, and wherein the mounting studs are configured to support the hydraulic pump assembly on the vehicle.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 8 shows a side view of the hydrostatic transmission subassembly in

FIG. 5.

FIG. 10 shows a front view of the exemplary mounting manifold of the hydrostatic transmission subassembly shown in FIGS. 5-9.

FIG. 11 shows a rear view of the mounting manifold.

DETAILED DESCRIPTION

The principles and aspects of the present invention have particular application to light vehicles, such as zero-turn-radius mowers, and thus will be described below chiefly in this context. It is understood, however, that the principles and aspects according to the present invention may be applicable to other vehicles with other types of transmissions, such as vehicles utilizing mechanical, hydrostatic, hydraulic, or electric drive systems.

Figure 1:
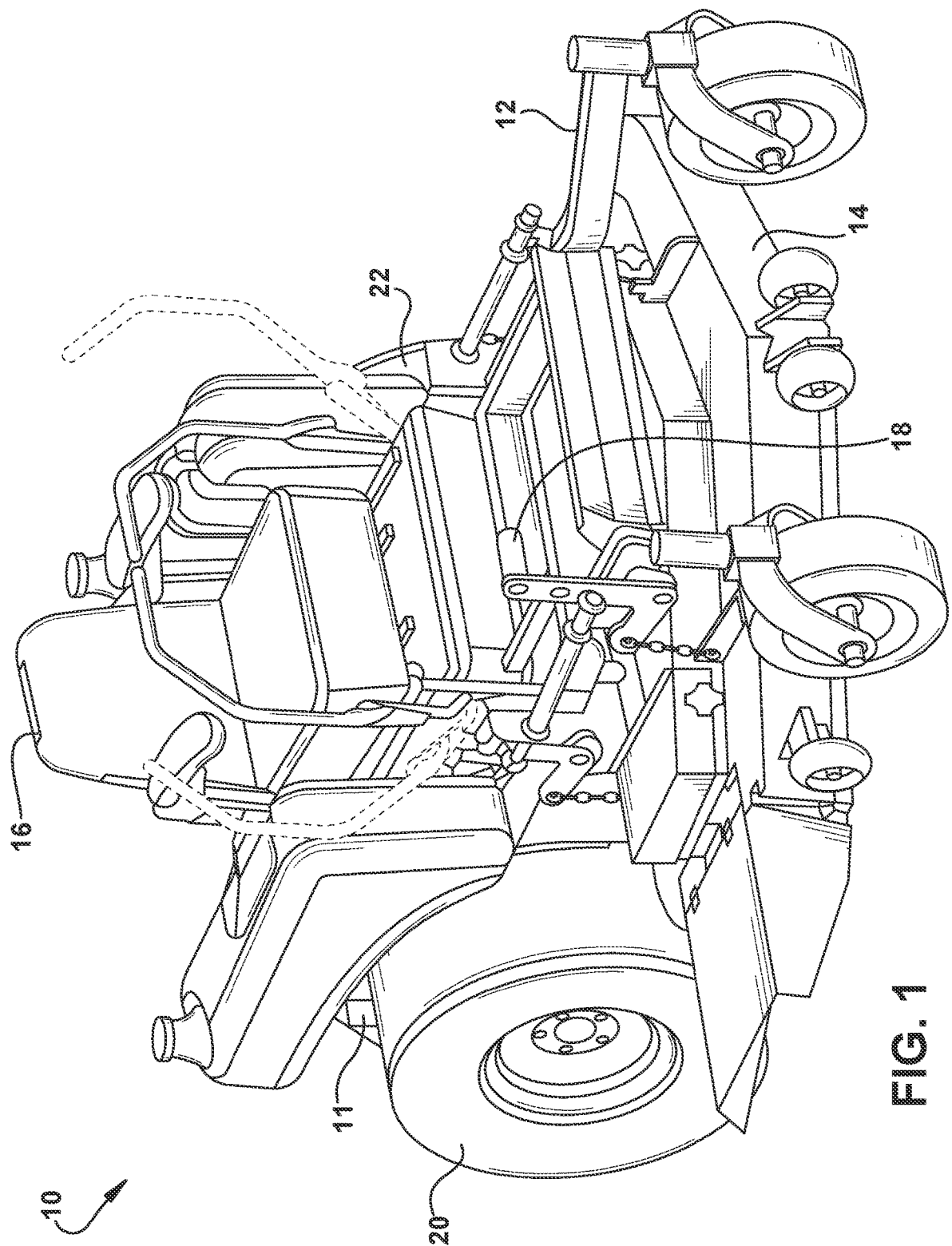
FIG. 1 shows a perspective view of a zero-turn-radius mower employing an exemplary hydrostatic transmission in accordance with embodiments of the present disclosure.

Referring to FIG. 1, an exemplary zero-turn-radius mower 10 is shown. The mower 10 may include a frame 12, a mower deck 14 supported by the frame 12, an operator seat 16, and a plurality of controls 18 for operating the mower 10. A rear mounted engine 11 may be mounted to the frame 12 behind the seat 16 to provide power to a hydraulic axle combination mounted to the frame 12.

Figure 2:
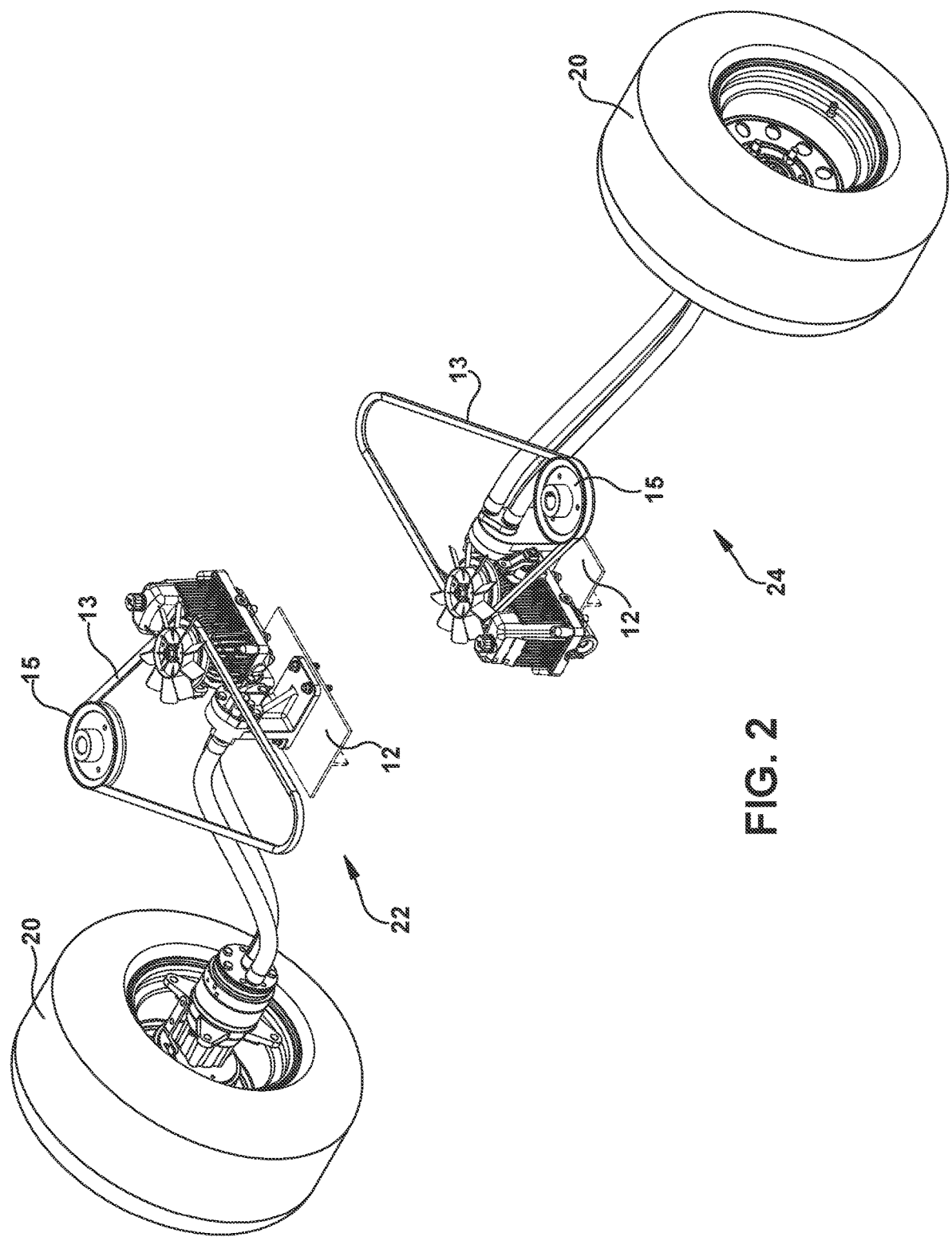
FIG. 2 shows a perspective view of a pair of exemplary hydrostatic transmissions according to an aspect of the present disclosure, which are shown coupled to corresponding drive mechanism(s) and wheels for propelling the mower.

Referring to FIG. 2, the hydraulic axle combination of the mower 10 is shown in further detail, including right-hand and left-hand hydrostatic transmissions 22, 24. The right-hand and left-hand hydrostatic transmissions 22, 24 are respectively driven by the engine 11 via respective belts 13 and pulleys 15 in a well-known manner. As shown, the right-hand hydrostatic transmission 22 and left-hand hydrostatic transmission 24 are essentially mirror images of each other. The hydrostatic transmissions 22, 24 can be independently controlled by an operator to independently drive respective rear wheels 20 to propel the mower 10 and provide zero-turn-radius functionality in a manner well-known in the art.

The design of the illustrated mower 10 is merely exemplary in nature, and it is understood that other mower designs and vehicle types can be used in accordance with the present invention. For example, in an alternative light vehicle configuration, a modular hydrostatic transaxle system includes a single hydrostatic transmission attached to a transaxle including a differential gearing system and an axle shaft. In a dual hydrostatic transmission system as described above, the right-hand and left-hand transmissions have comparable components, although the precise configuration of the components relative to each other may differ because of the differing relative position of the right-side wheel relative to the right-side transmission, versus the position of the left-side wheel relative to the left side transmission (as shown in FIG. 2, for example). In particular, certain components may be flipped and/or mirror imaged to accommodate the right-side wheel versus the left-side wheel, although the components on both sides generally are comparable. For convenience and conciseness, the right-hand hydrostatic transmission 22 will be described in further detail below.

Figure 3:
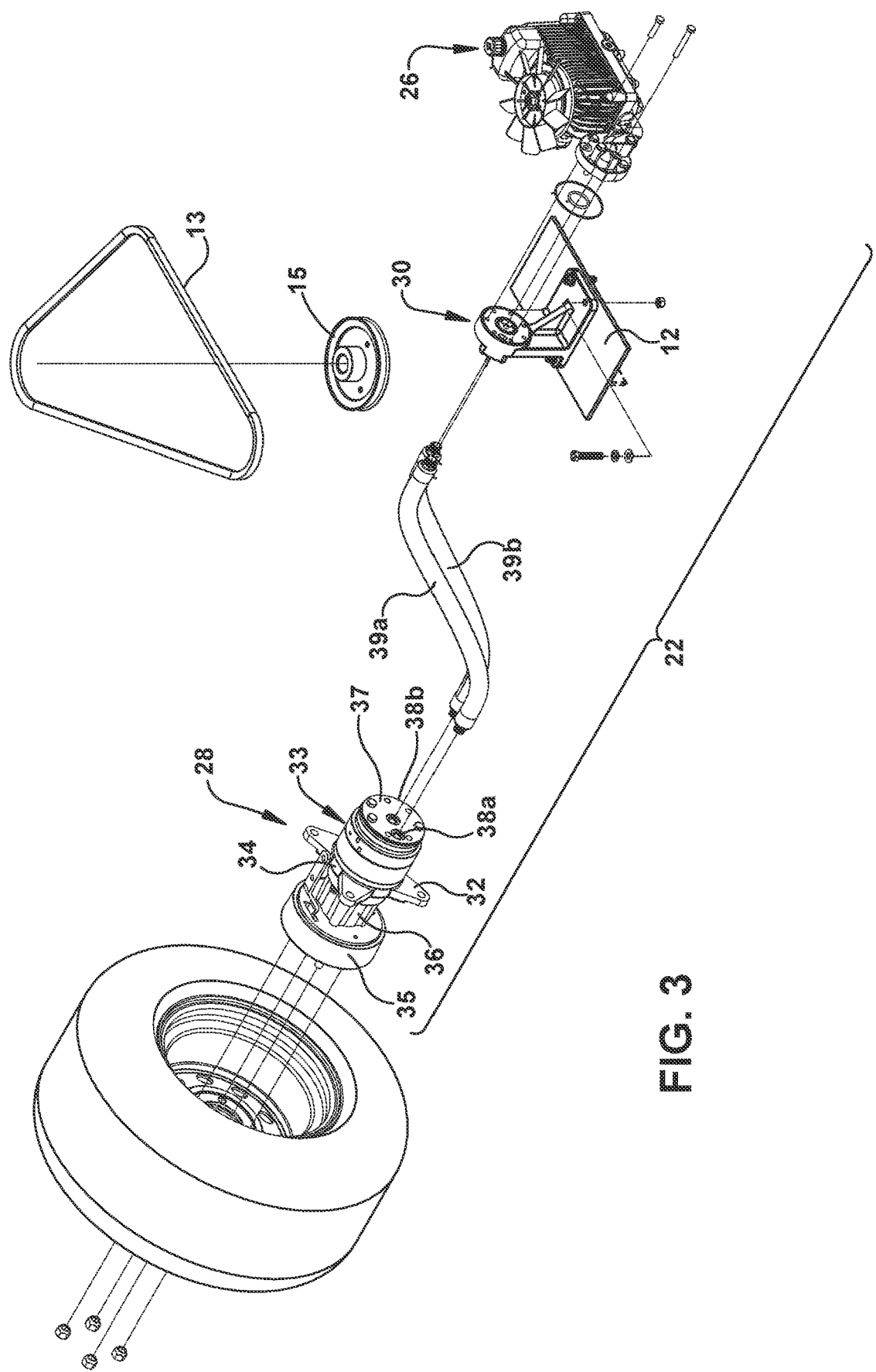
FIG. 3 shows an enlarged, exploded perspective view of one of the hydrostatic transmissions in FIG. 2, including the corresponding drive mechanism(s) and wheel.

Referring to FIG. 3, the hydrostatic transmission 22 generally includes a hydraulic pump assembly 26, a hydraulic motor assembly 28, and an adapter manifold 30 that is discrete, i.e. individually separate and distinct, with respect to each of the pump assembly 26 and the motor assembly 28. As shown, the adapter manifold 30 is configured as a mounting manifold 30 that is mounted to a portion of the mower 10 (e.g., frame 12 or chassis) and supports the pump assembly 26 (also referred to as pump 26) by suspending the pump 26 from one side of the mounting manifold 30, as described in further detail below. In exemplary embodiments, the motor assembly 28 (also referred to as motor 28) is mounted separately from the mounting manifold 30 and thus remote from the mounting manifold 30 and pump assembly 26, such as to another portion of the mower 10 via a mounting bracket 32. As shown, the mounting manifold 30 is interposed between the pump assembly 26 and the motor assembly 28, and includes suitable porting and fluid passages for providing a fluid connection between the pump 26 and separately mounted motor 28 for communicating flow of hydraulic fluid in the transmission 22, as described in further detail below.

The hydraulic motor 28 may be any suitable motor, such as a low speed, high torque hydraulic motor. Generally, the hydraulic motor 28 includes a rotor-set subassembly portion 33, which may contain an internal rotor set, and a motor housing portion 34 with an output shaft (hidden from view) extending outwardly of the motor housing portion 34. The output shaft extends through the motor housing portion 34 for ultimately driving a wheel hub 35, either directly or through a gear reduction assembly 36 as are known in the art. The rotor-set subassembly portion 33 may be secured to the motor housing portion 34 via a wear plate. A fluid manifold 37 may be provided including motor ports 38a and 38b, which in the illustrated embodiment are fluidly connected to the mounting manifold 30 via one or more fluid conduits 39a, 39b to provide flow of hydraulic fluid between the pump 26 and motor 28.

In exemplary embodiments, the motor 28 components of the hydrostatic transmission 22 may be conventional or may be uniquely designed for a particular application. For example, in a conventional motor 28 configuration, the output shaft is supported in the housing by a front radial bearing and a rear radial bearing. Between such bearings, the output shaft may further be secured by a plurality of bearings, washers, and/or seals. On the output end of the output shaft, a seal may be provided against the motor housing portion 34, and a wheel nut may be fitted on the driving end of the output shaft. In a conventional motor 28, the fluid manifold 37 may be supported adjacent a commutator ring that encloses a commutator and is sealed with a commutator seal, and communicates the hydraulic fluid to the rotor set via the manifold. The various components are sealed utilizing a plurality of O-ring seals. The motor 28 may further include a drive link that is supported in position at least in part with a thrust washer. The drive link typically includes first splines that interface with the inner rotor of the motor rotor set subassembly 33. The drive link further includes second splines that interface with a cooperating spline of the output shaft. Through such interfacing linkages, the motor 28 rotor drives the output shaft via acting on the drive link.

Conventionally, the rotor-set subassembly 33 may have a gerotor configuration including an inner rotor that rotates within a motor stator against and relative to a plurality of roller vanes. The inner rotor rotates under the force of the hydraulic fluid flow from the pump. Spaces defined between the inner rotor and motor stator change volume as the inner rotor rotates within the motor stator relative to the roller vanes. This action permits the inflow and forces the outflow of the hydraulic fluid from the motor, which causes the inner rotor to rotate. Splines of the inner rotor interact with the first splines of the drive link such that the rotation of the inner rotor drives the rotation of the drive link. As referenced above, the second splines interface with a cooperating spline of the output shaft in turn to drive the rotation of the output shaft and thereby the wheel 20, either directly or indirectly via gear reduction 36 and hub 35.

Figure 4:
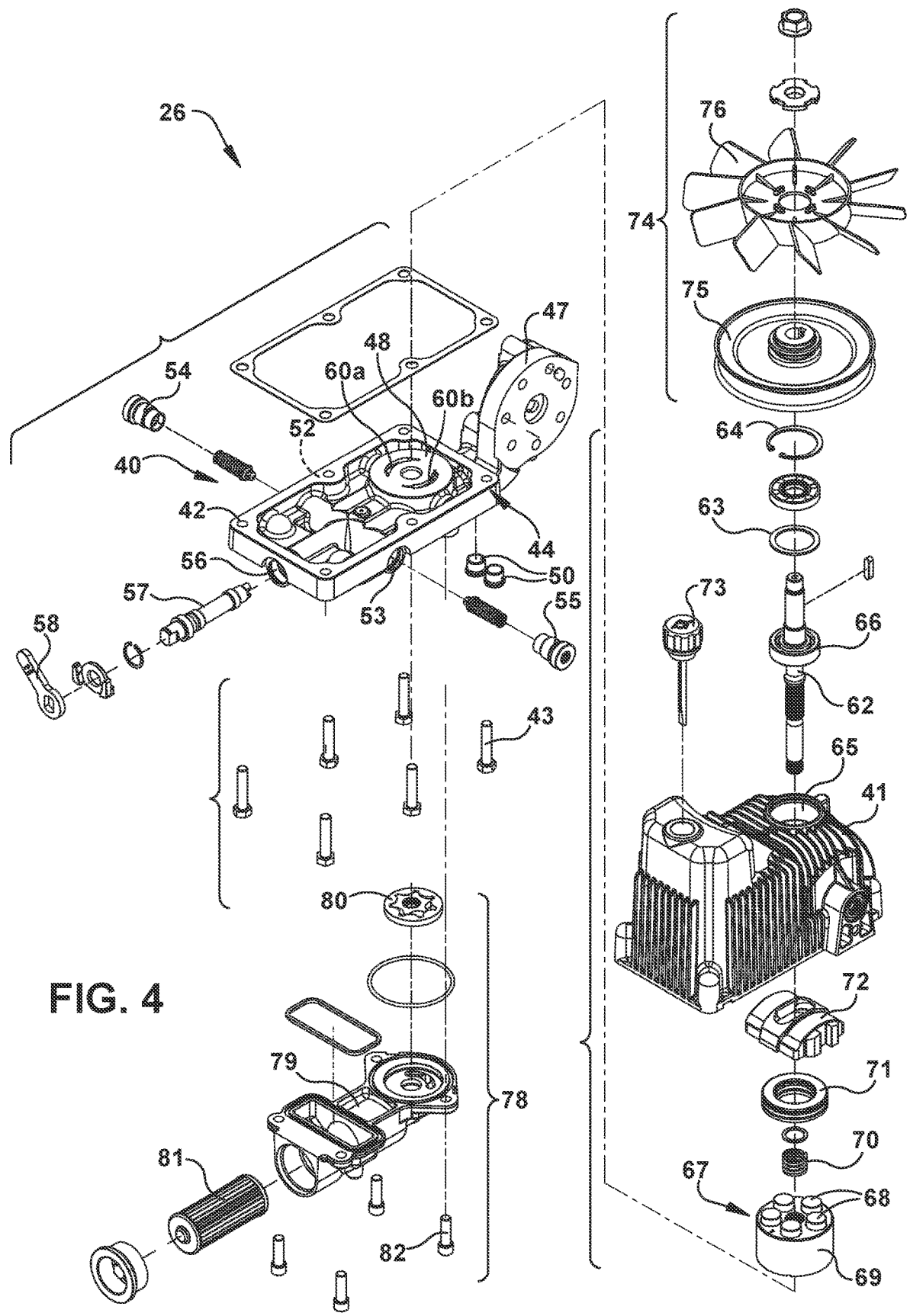
FIG. 4 shows an exploded view of an exemplary pump assembly of the hydrostatic transmission shown in FIG. 3.
Figure 5:
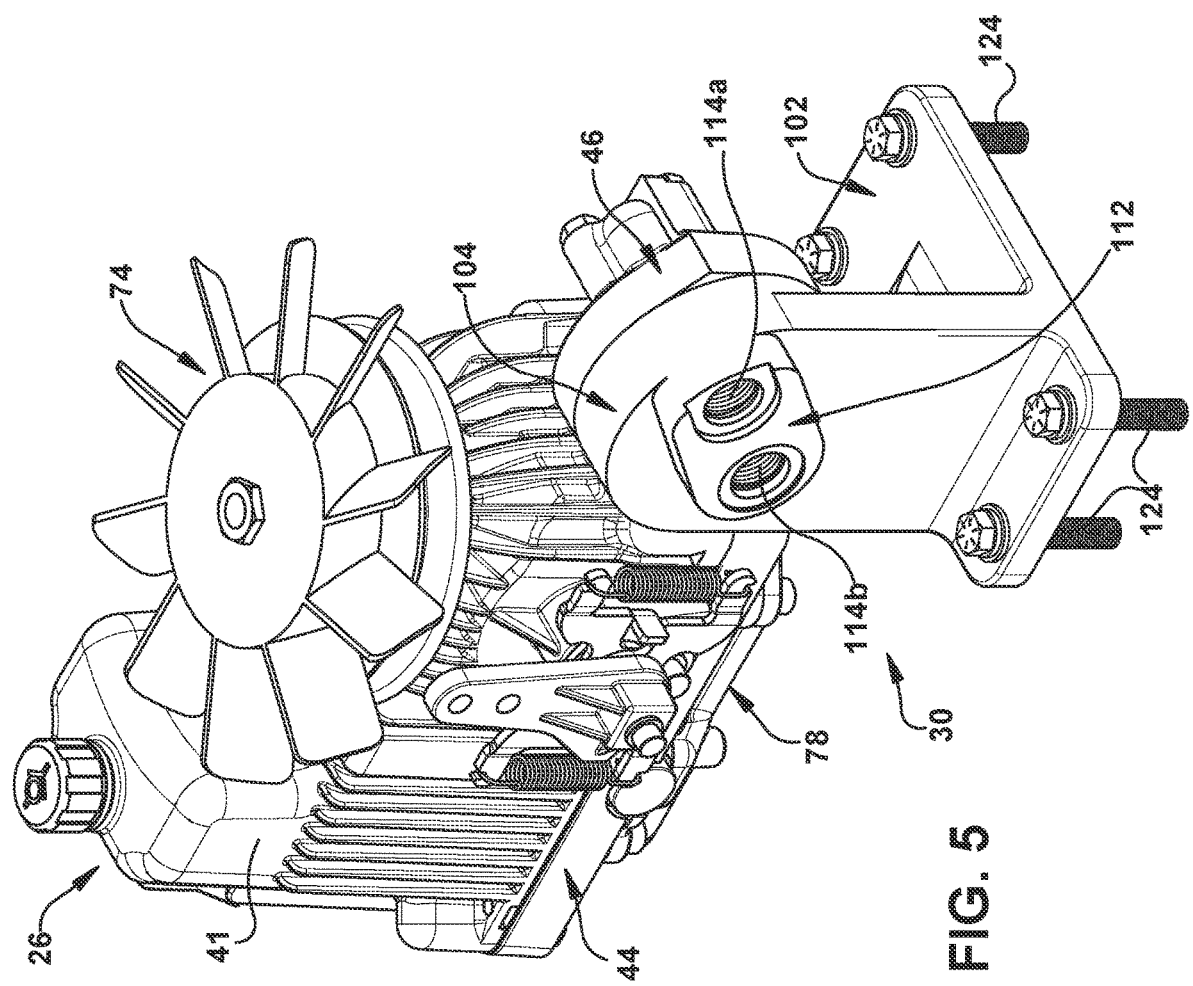
FIG. 5 shows a top, front perspective view of an exemplary hydrostatic transmission subassembly of the hydrostatic transmission shown in FIG. 3, which includes an exemplary mounting manifold in combination with the pump assembly.
Figure 6:
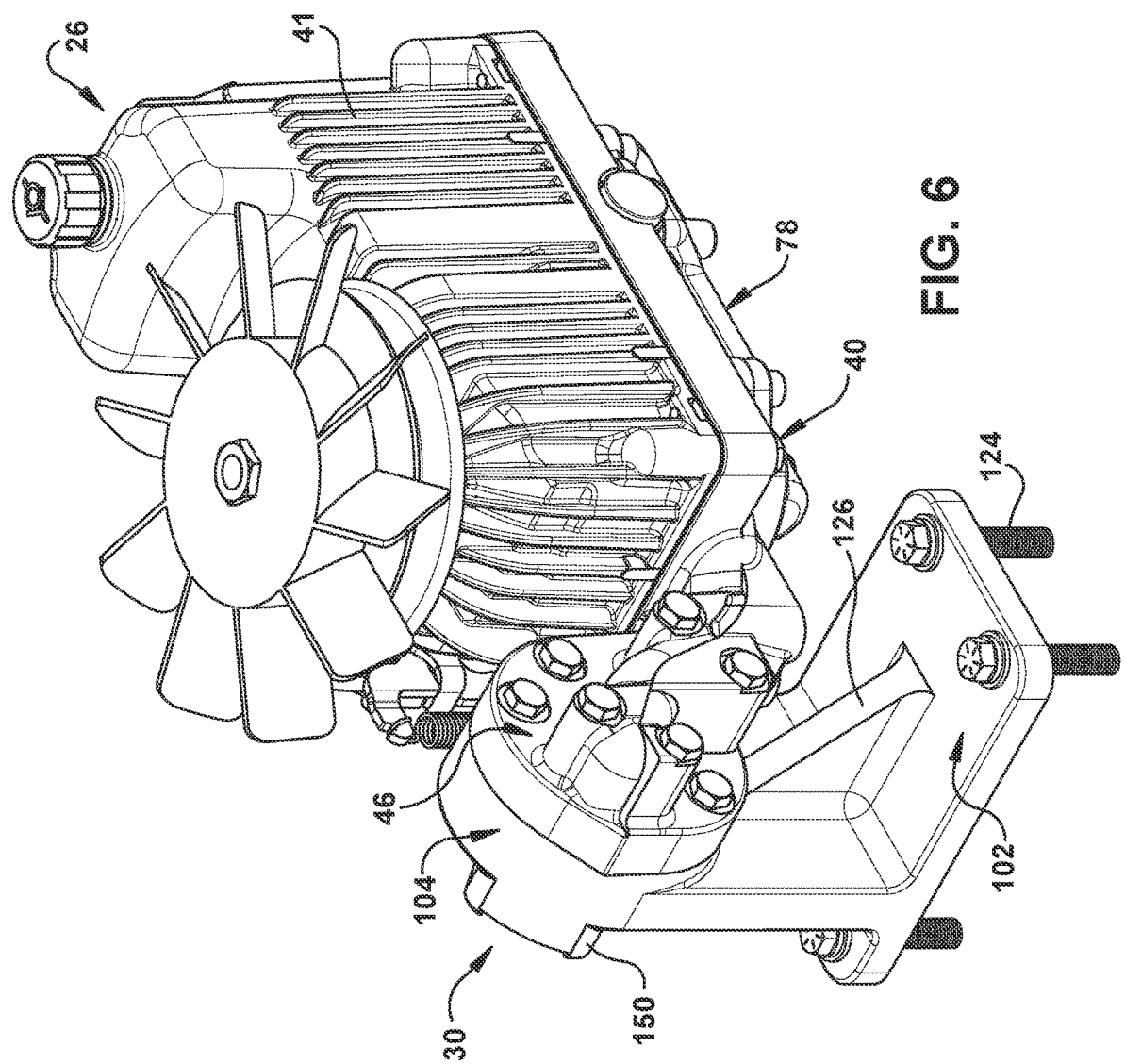
FIG. 6 shows a top, rear perspective view of the hydrostatic transmission subassembly in FIG. 5.
Figure 8:
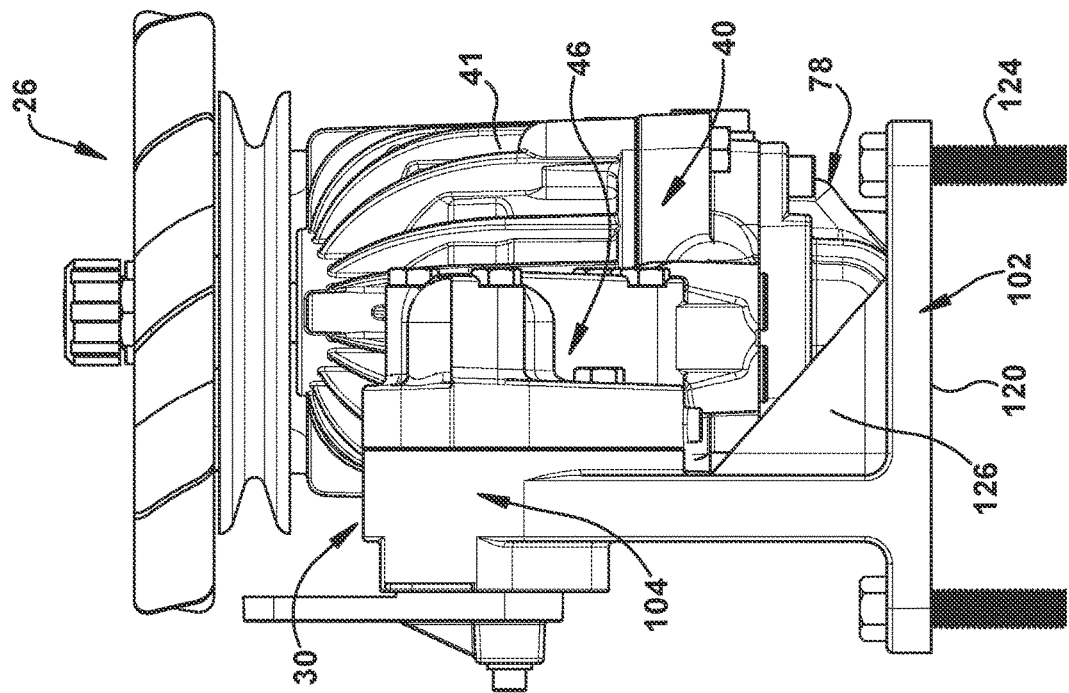
Figure 7:
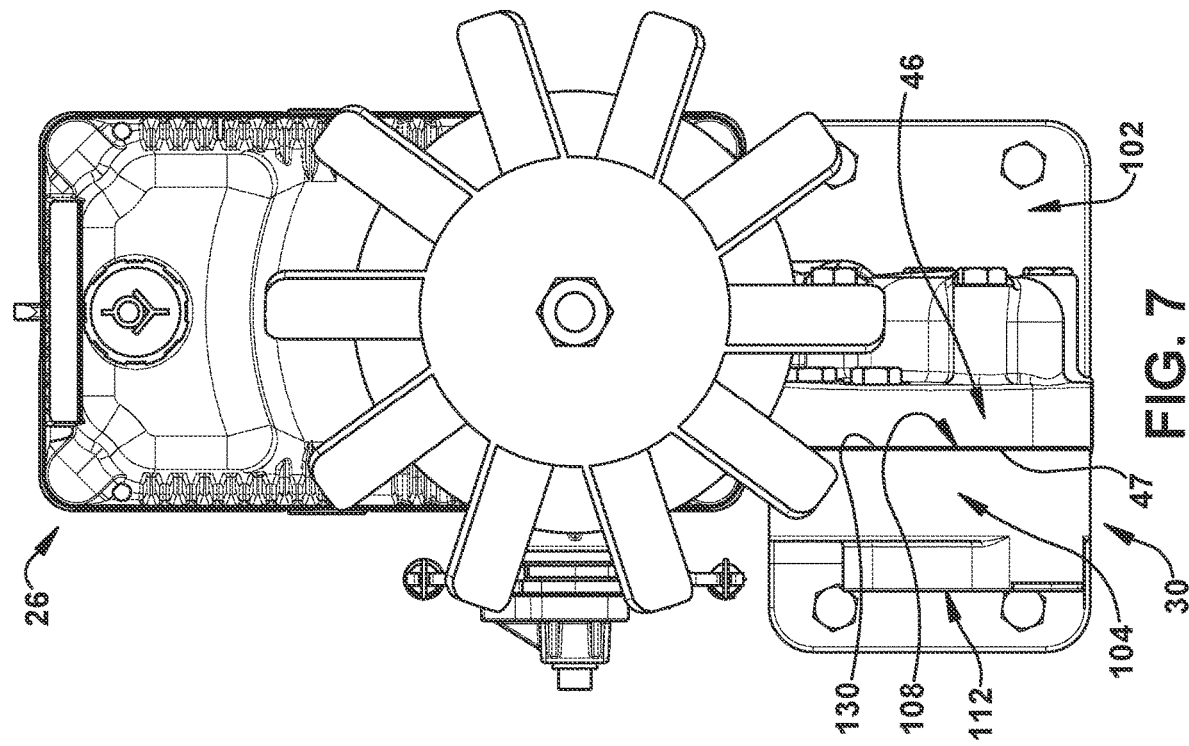
FIG. 7 shows a top view of the hydrostatic transmission subassembly in FIG. 5.

Referring to FIG. 4, the hydraulic pump assembly 26 is shown in further detail. Generally, the hydraulic pump assembly 26 may include any suitable pump, such as a variable displacement piston pump. As shown, the hydraulic pump assembly 26 includes a top housing 41 and an endblock subassembly 40 coupled to the top housing 41. The top housing 41 is coupled or fixed to the endblock subassembly (also referred to as endblock 40) such that the top housing and endblock cooperate to form a reservoir for the hydraulic fluid, and also form an enclosure for the hydraulic pump 26. The endblock subassembly 40 supports the hydraulic pump within the top housing 41, and the endblock subassembly 40 is coupled to the mounting manifold 30 (FIG. 3) to enable the mounting manifold 30 to suspend and support the pump assembly 26. As a component of the hydraulic pump assembly 26, the endblock subassembly 40 provides a fluid connection between the pump 26 and mounting manifold 30, in which the mounting manifold 30 is fluidly connected to the hydraulic motor 28, such as via the one or more fluid conduits 39a, 39b (FIG. 3), to provide flow of hydraulic fluid between the pump 26 and motor 28.

As shown in FIG. 4, the endblock subassembly 40 may include housing fastening receivers 42 that receive housing fasteners 43. The housing fasteners 43 secure the endblock subassembly 40 via the housing fastening receivers 42 to the top housing 41. The fasteners 43 may be a plurality of top housing bolts. In this manner, the endblock subassembly 40 and top housing 41 form an enclosed reservoir for containing hydraulic fluid of the pump. Specifically, the top portion of the endblock subassembly 40 serves as a bottom portion of the hydraulic fluid reservoir. The resultant reservoir may define a sufficient volume in excess of the hydraulic fluid volume constituting an integral fluid expansion volume. The integral fluid expansion volume provides adequate space for the hydraulic fluid to expand during temperature changes, particularly during operation. By providing a reservoir with adequate expansion volume integral in the enclosure formed by the top housing 41 and endblock subassembly 40, the hydraulic fluid of the hydrostatic transmissions for the different wheels are always separate. This configuration has space-saving advantages over conventional configurations that have a common or shared fluid reservoir and expansion volume that accommodates the various wheels. This configuration relatedly eliminates the need for any external expansion reservoir, whether shared or separate for the different wheels, as is required in some conventional configurations.

As shown, the endblock subassembly 40 may include a pump interfacing section 44 and a porting manifold 46 having a pump porting interface 47 that interfaces with the mounting manifold 30. The porting manifold 46 includes suitable porting 49 and one or more internal passages (hidden from view) for communicating hydraulic fluid between the hydraulic pump 26 and the hydraulic motor 28 via the mounting manifold 30. As shown, the pump interfacing portion 44 includes a pump running face 48 that interfaces with the pump components. As further described below, the pump includes a piston-containing barrel that rotates adjacent to the pump running face 48. The pump, therefore, interfaces directly with the endblock subassembly 40 at the pump running face 48.

The endblock subassembly 40 also may include first and second ports (hidden from view) extending into first and second flow passages, respectively, which may receive magnetic plugs 50. The magnetic plugs 50 are disposed in the first and second ports to capture debris, such as metallic debris, from the hydraulic pump and/or hydraulic motor. The endblock subassembly 40 also includes valve ports 52 and 53 for receiving relief valves/plugs 54 and 55 respectively, and a port 56 for receiving a bypass valve 57. The bypass valve is connected to a bypass lever 58 and sealed by a snap ring. The bypass lever is operable to short circuit the hydraulic fluid flow so as to render the transmission in a neutral position, which is useful, for example, in circumstances in which the operator may wish to push the vehicle.

Figure 9A:
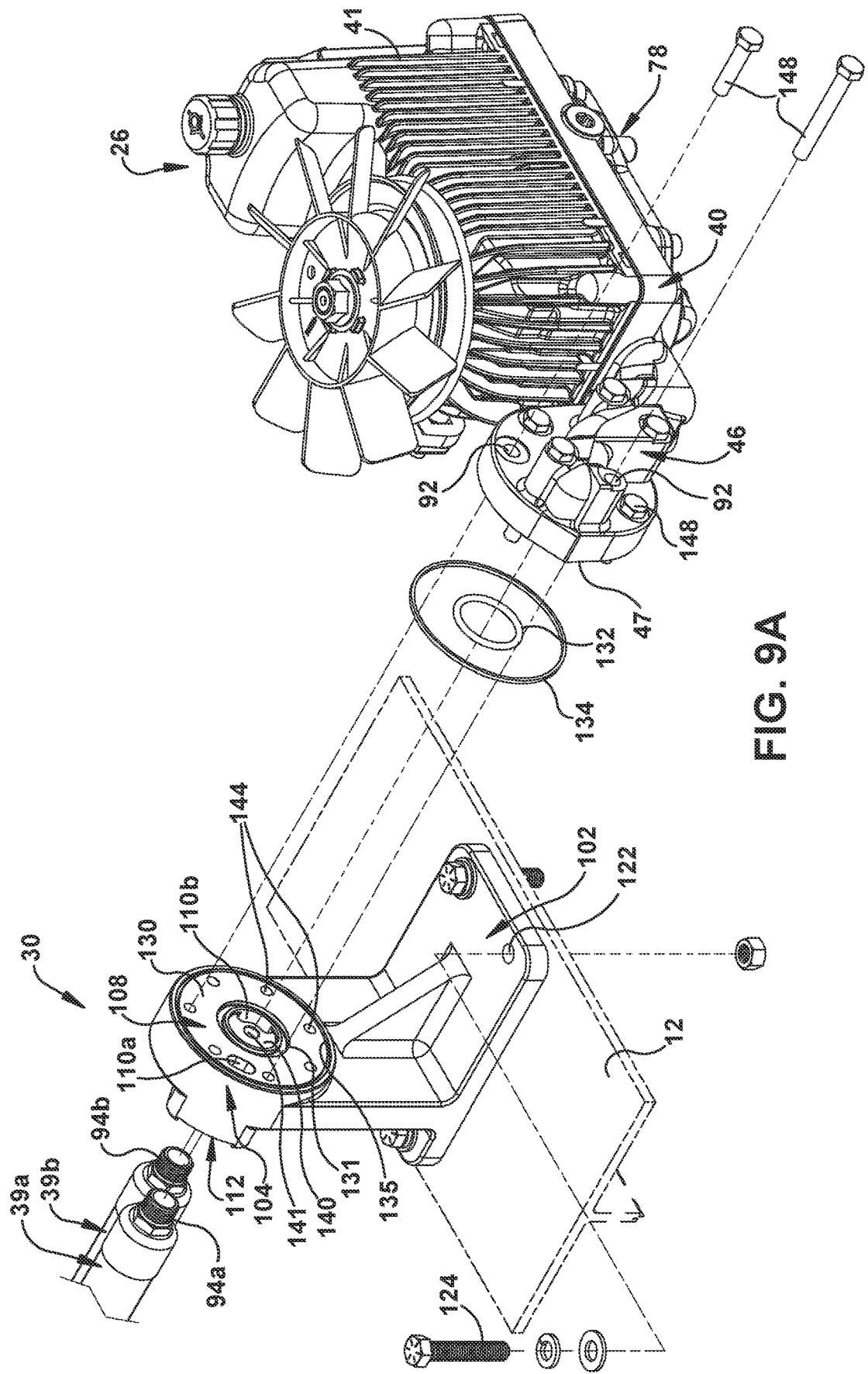
FIG. 9A shows a top, rear exploded perspective view of the hydrostatic transmission subassembly in FIG. 5.
Figure 9B:
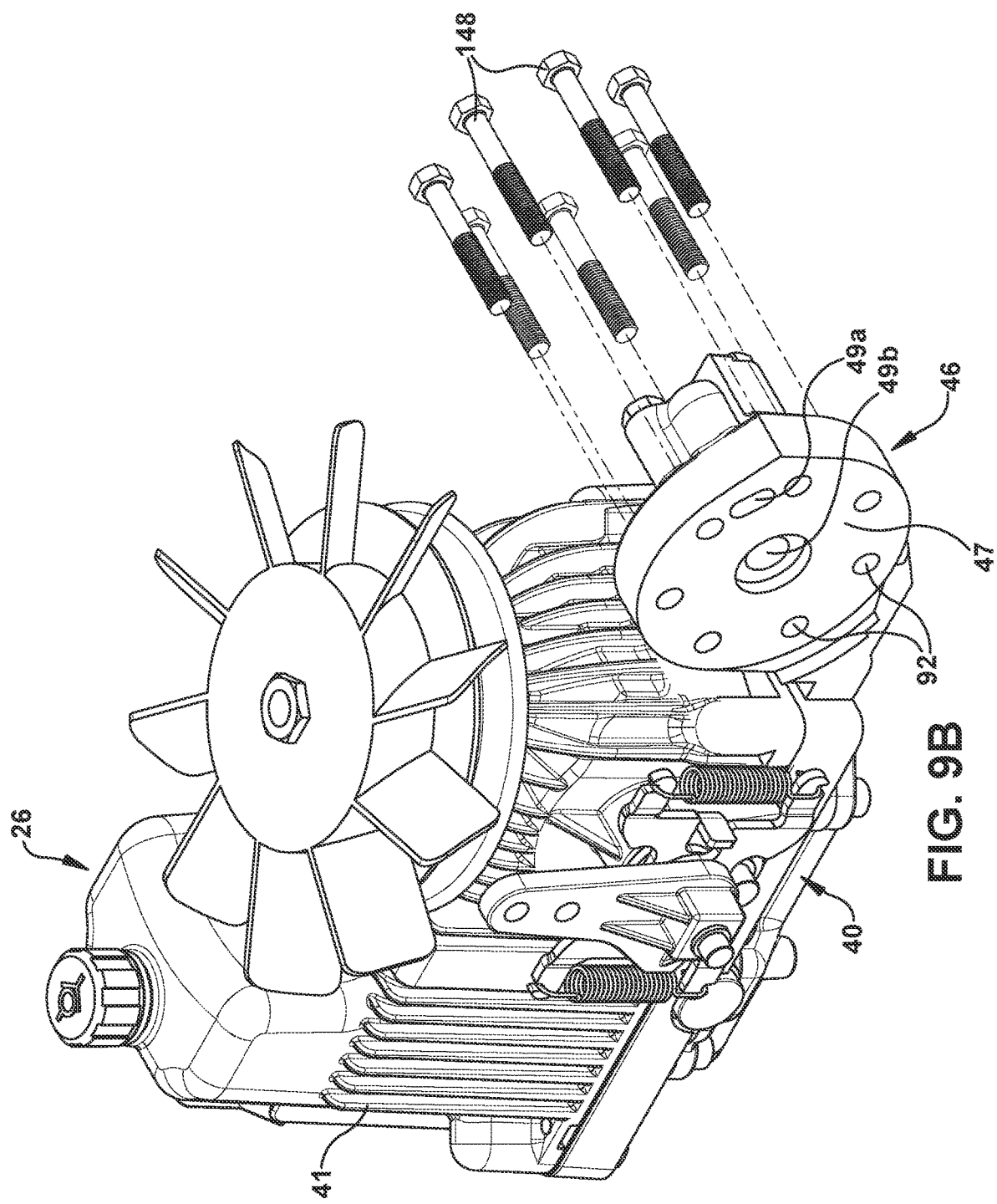
FIG. 9B shows a top, front exploded perspective view of the hydrostatic transmission subassembly in FIG. 5.

As shown in the illustrated embodiment, the endblock subassembly 40, and more particularly the porting manifold 46 formed by the endblock subassembly 40 may be configured as follows. As shown, the pump interfacing portion 44 includes first and second kidney ports 60a and 60b that extend through the pump running face 48 for interfacing with a pump, and constitute the openings for the first and second internal passages that extend through the porting manifold 46. The kidney ports, therefore, provide a fluid connection with the pump for the entry of hydraulic fluid into the endblock subassembly 40 and a return flow. The internal passages (not shown) extending through the porting manifold 46 may include first and second internal passages from the kidney ports 60a and 60b that end in corresponding pump ports 49a, 49b opening through the pump porting interface 47. In exemplary embodiments, the pump porting manifold 46 extends upwardly from the pump interfacing portion 44 such that the pump ports 49a, 49b (FIG. 9b) are raised in elevation relative to the pump kidney ports 60a, 60ab. In an exemplary operation of fluid flow, the pump provides fluid flow to port 60a for driving the motor in the forward direction (clockwise rotation of the transmission output shaft when looking at the output shaft). The pump provides flow to port 60b for driving the motor in the reverse direction (counterclockwise rotation of the transmission output shaft when looking at the output shaft). Commensurately, the mounting manifold 30 and motor assembly 28 have corresponding fluid ports for communicating fluid into and out from the motor relative to the endblock subassembly 40, as described in further detail below.

In the illustrated embodiment, the hydraulic pump assembly 26 includes an input shaft 62 that is sealed with a shaft seal 63 and washer secured by a snap ring 64. The input shaft 62 extends into the top housing 41 through a bore 65 such that a bearing 66 on the input shaft rests within the bore. A piston rotating group 67 includes a plurality of pistons 68 that are supported on a barrel 69. The piston rotating group further includes a barrel spring 70 and washer that support a thrust bearing 71. The input shaft 62 drives the piston rotating group such that the piston rotating group rotates against the pump running face 48 of the endblock subassembly 40 and adjacent to a moveable swash plate 72. In operation, the operator effects control via an input lever (hidden from view) that operates though a trunnion arm and control block, which causes a rotation of the moveable swash plate 72. For example, the swash plate may rotate within a range of ±14°. With the rotation of the swash plate, as the pump barrel rotates under the driving force of the input shaft, the pistons extend and contract against the swash plate to drive the hydraulic fluid in and out so as to pump the hydraulic fluid through the endblock subassembly to the motor. The input shaft 62 is driven via action on a key. A dipstick and breather 73 provide a pressure release mechanism, and can be used to check the hydraulic fluid level in the reservoir. In exemplary embodiments, a pulley/fan assembly 74 is provided for use with the hydraulic pump assembly 26. As shown, a portion of the input shaft 62 extends outward from the top housing 41. The input shaft 62 further extends through an input belt pulley 75 and a fan 76 that operates to provide cooling for the hydrostatic transmission. Enhanced cooling is provided by mounting the fan to the input shaft directly adjacent to the input belt pulley. The components of the assembly 74 are secured to the top housing by a nut and fan spacer.

In exemplary embodiments, the endblock subassembly 40 may support a charge pump/filter housing assembly 78, which is coupled to a bottom portion of the endblock subassembly 40 in the illustrated embodiment. The charge pump/filter assembly 78 may include a charge pump/filter housing 79 that houses a charge pump 80 and a filter 81. The charge pump 80 may include a gerotor assembly that charges the transmission by pumping hydraulic fluid into the hydraulic fluid reservoir. The hydraulic fluid may be pumped through the filter 81, which may be secured within the housing 79 using a filter plug. Suitable seals, such as O-ring seals, may be employed to seal the housing 79 to the endblock subassembly 40, and charge pump fasteners 82, such as bolts, may be used to secure the charge pump/filter assembly 78 to a bottom of the endblock subassembly 40. In this manner, a top portion of the charge pump/filter housing 78 abuts the bottom portion of the endblock subassembly 40, and the top portion of the charge/pump filter housing includes a recess for receiving the charge pump 80. The charge pump/filter assembly 78, therefore, also is modular in nature and easily accessed for maintenance.

The endblock subassembly 40 configured as described above has advantages over some conventional hydrostatic transmission designs. For example, the endblock subassembly 40 supports several of the components, including the top housing 41 that encloses the pump portion, and supports and encloses the charge pump/filter housing 78. Accordingly, the charge pump 80, filter 81, and corresponding fluid passages may be integrated with the pump assembly 26. This is in contrast with some conventional designs in which additional fluid conduits and mounting locations are required to connect a filter and/or charge pump to the hydraulic pump. In addition, as referenced above, when secured to the top housing 41 the endblock subassembly 40 forms the bottom portion of the fluid reservoir. In other words, the endblock subassembly 40 may form an external part of the pump assembly 32. This is contrast to some conventional configurations, in which a larger carrier housing is provided to enclose all the components, including the fluid manifold that communicates hydraulic fluid between the pump and the motor. An advantage of such an external design of the endblock subassembly 40 is that overall size of the hydrostatic transmission is reduced. Lateral width of the hydrostatic transmission is reduced in particular. This is significant for zero-turn radius vehicles, in which space is at a premium. The integrated nature of the pump porting manifold 46 with the pump interfacing portion 44 of the endblock subassembly 40 also provides advantages in reducing the number of parts, and may enhance the modular capabilities of the design.

Referring to FIGS. 5-14, the exemplary mounting manifold 30 is shown and described in further detail. As discussed above, the mounting manifold 30 is adapted for mounting to a portion of the mower 10 (e.g., frame 12) for supporting the transmission pump 26, and includes suitable porting and fluid passages for providing a fluid connection between the transmission pump 26 and the separately mounted hydraulic motor 28 for communicating flow of hydraulic fluid in the transmission 22. More particularly, the mounting manifold 30 includes a mounting section 102 adapted for mounting to a portion of the mower 10 (e.g., frame 12), and a fluid interface section 104 extending from the mounting section 102. The fluid interface section 104 includes a pump interface 108 having pump interface porting, such as pump interface ports 110*a*, 110*b*. The fluid interface section 104 also includes a motor interface 112 having motor interface porting, such as motor interface ports 114*a*, 114*b*.

As shown, the mounting manifold 30 is configured to be discretely and interposingly coupled between the pump 26 and the motor 28, and includes one or more internal fluid passages 116*a*, 116*b* (shown in FIG. 12) fluidly connecting the pump interface ports 110*a*, 110*b* with the motor interface ports 114*a*, 114*b*. In exemplary embodiments, the pump interface 108 engages with the pump porting interface 47 of the pump porting manifold 46, such that the pump interface ports 110*a*, 110*b* fluidly connect to the corresponding pump ports 49*a*, 49*b* of the pump porting manifold 46. In the illustrated embodiment, the motor interface ports 114*a*, 114*b* of the mounting manifold 30 are fluidly connected to the fluid conduits 39*a*, 39*b* to fluidly connect the mounting manifold 30 to the motor ports 38*a*, 38*b*. In this manner, the mounting manifold 30 provides a fluid connection via the fluid interface section 104 for transmitting hydraulic fluid between the pump 26 and the motor 28 for operation of the hydrostatic transmission 22.

The mounting section 102 may take any suitable form for mounting to a portion of the mower 10 and supporting the pump assembly 26 via the fluid interface section 104. In the illustrated embodiment, for example, the mounting section 102 is formed as a flat block or plate, having a lower interface 120 for engaging the mower frame 12. The mounting section 102 includes a plurality of fastener receivers 122, such as through-holes, for receiving corresponding fasteners 124, such as bolts, for being threadably received in corresponding receivers in the frame 12. It is understood that although the mounting manifold 30 is described as being mounted to the mower frame 12, the mounting manifold 30 could be mounted to any structural portion of the mower 10 as would be understood by those having ordinary skill in the art.

In exemplary embodiments, the fluid interface section 104 extends upright in the vertical direction from the mounting section 102, such as at 90-degrees or substantially perpendicular relative to the mounting section 102. As shown, the fluid interface section 104 may be unitary with the mounting section 102. A support portion 126 may be provided on the pump side of the mounting manifold 30 to bolster support. In exemplary embodiments, the portion of the fluid interface section 104 extending upright from the mounting section 102 may be formed as a flat plate or block having sufficient thickness to support and suspend the pump assembly 26. In the illustrated embodiment, the pump interface 108 is on one side of the fluid interface section 104, and the motor port interface 112 is directly on the opposite side. This provides a relatively short and/or straight path for the internal fluid flow passages 116*a*, 116*b*, which may minimize flow perturbations and simplify construction.

As shown, the pump interface 108 may include a flat, round mating face 130 on one side of the fluid interface section 104. The pump interface ports 110*a*, 110*b* open through the mating face 130. The pump interface ports 110*a*, 110*b* are configured to align with and fluidly connect with the corresponding pump ports 49*a*, 49*b* when the pump interface 108 is sealingly coupled to the porting manifold interface 47. In the illustrated embodiment, for example, the pump interface 108 includes the second pump interface port 110*b* at a radially inward location relative to the first pump interface port 110*a*, which corresponds with the location of the pump ports 49*a*, 49*b* of the porting manifold 46. In addition, the pump interface ports 110*a*, 110*b* may be kidney-shaped ports to correspond with the shape of the pump ports 49*a*, 49*b*.

Generally, one of the ports, such as the first port 110*a*, will be a high-pressure supply port that communicates high-pressure fluid from the pump 26 to the motor 28 when the mower 10 is operating in a forward direction. The other one of the ports, such as the second port 110*b*, will be a low-pressure return port from the motor 28 to the pump 26 when the mower 10 is operating in the forward direction. When the direction of the mower 10 is reversed, the second port 110*b* will be the high-pressure supply port and the first port 110*a* will be the low-pressure return port.

To fluidly separate the high-pressure port (e.g., 110*a*) from the low-pressure port (e.g., 110*b*), the mounting manifold 30 may utilize one or more suitable seals. For example, in the illustrated embodiment, the mounting face 130 includes a face groove 131 having a seal 132 disposed therein that fluidly separates the fluid interface ports 110*a*, 110*b* when the pump interface 108 sealingly interfaces with the pump porting interface 47. More particularly, because the pump interface ports 110*a*, 110*b* (and corresponding pump ports 49*a*, 49*b*) are radially offset relative to each other in the illustrated embodiment, the face groove 131 and seal 132 are radially interposed between the ports 110*a*, 110*b*, such that the groove 131 and seal 132 radially outwardly surround the second pump interface port 110*b*, and are located radially inwardly of the first pump interface port 110*a* to provide fluid separation between these ports 110*a*, 110b. In addition, to prevent fluid from escaping outwardly of the pump interface 108, another seal 134 may be provided in a face groove 135 located radially outwardly of the pump interface port 110a, such as near a circumferential edge of the pump interface 108. The seals 132 and/or 134 may be any suitable type of seal to provide the desired sealing functionality, such as elastomeric O-ring seals. In the illustrated embodiment, for example, the seal 132 may be made of nitrile, and includes a round cross-section which is relatively large compared to the seal 134. The seal 134 may be made of a similar material, and may have a square cross-section, as shown.

To facilitate mating of the pump interface 108 of the mounting manifold 30 with the pump porting interface 47 of the pump porting manifold 46, the pump interface 108 may have complementary features to the pump porting interface 47. For example, as shown the pump interface 108 may include recessed regions 140, 141 which may facilitate flat sealing engagement between the interfaces 108 and 47.

To mountingly secure the pump assembly 26 to the mounting manifold 30, both the pump porting manifold 46 and the mounting manifold 30 include fastening receivers 144, 92 that receive corresponding fasteners 148, such as hex bolts. In the illustrated embodiment, the fastening receivers 92 of the pump porting manifold 46 are configured as through holes, and the fastening receivers 144 of the mounting manifold 36 are configured as threaded blind bores that threadably receive corresponding threads of the fasteners 148. In the illustrated embodiment, the receivers 144 open through the mating face 130, are located radially inwardly of the seal groove 135, and are evenly circumferentially spaced apart from each other.

As discussed above, the motor interface 112 of the mounting manifold 30 is configured to provide fluid connection to the hydraulic motor 28. More particularly, in the illustrated embodiment, the hydraulic motor 28 is separately and distally mounted away from the mounting manifold 30 and pump assembly 26, and the motor interface ports 114a, 114b of the mounting manifold 30 are configured to fluidly connect with the motor ports 38a, 38b of the motor 28 via fluid conduits 39a, 39b. The fluid conduits 39a, 39b may be any suitable conduit, such as a flexible rubber hose with suitable connectors 94a, 94b on one or more ends. In exemplary embodiments, the connectors 94a, 94b are threaded connectors with outward threads, and the motor interface ports 38a, 38b include inward threads 146 for threadably receiving and securing the connectors 94a, 94b to the motor interface 112 of the mounting manifold 30. As shown, the motor interface 112 may include a protruding portion 150 that provides additional thickness to the motor interface 112 to accommodate sufficient thread length for the motor interface ports 114a, 114b.

Figure 13:
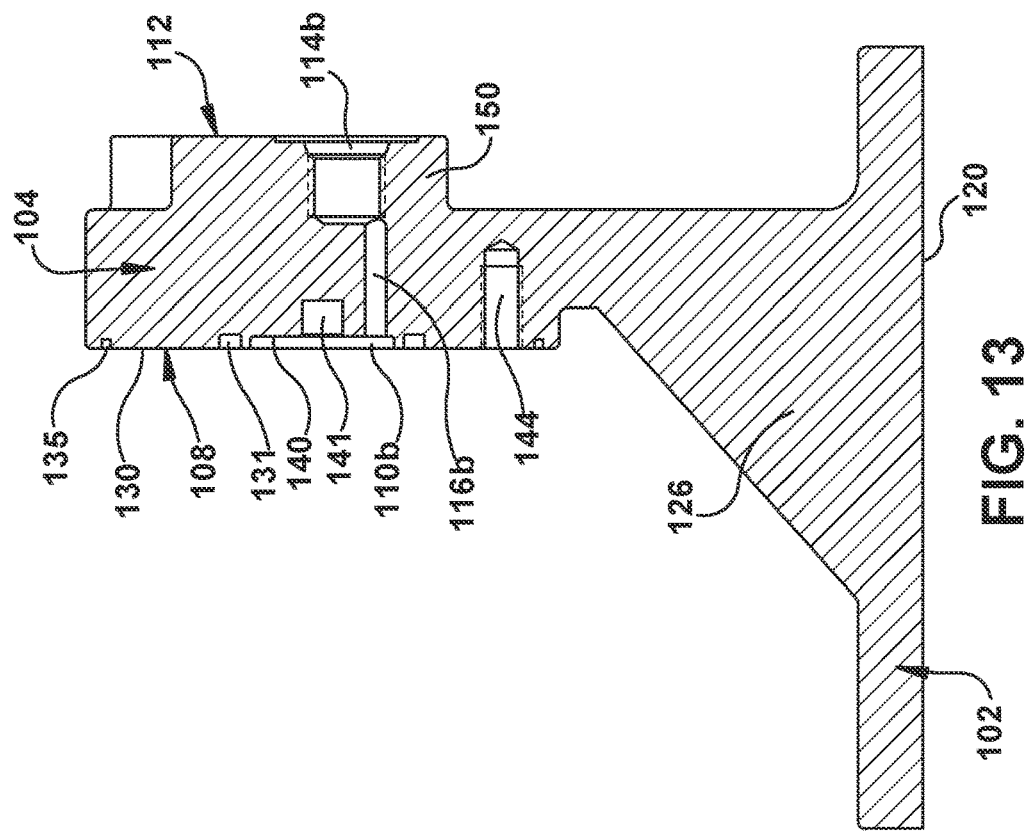
FIG. 13 shows a cross-sectional view taken about the line B-B in FIG. 10.
Figure 12:
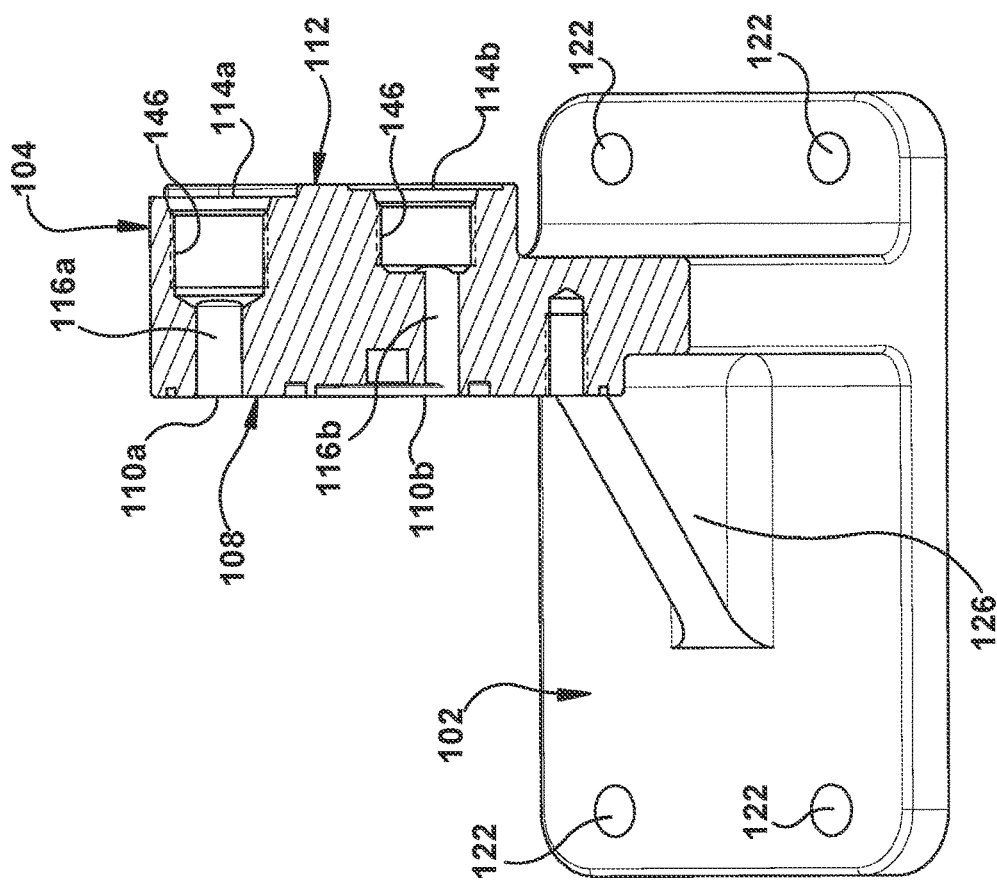
FIG. 12 shows a cross-sectional view taken about the line A-A in FIG. 10.
Figure 14:
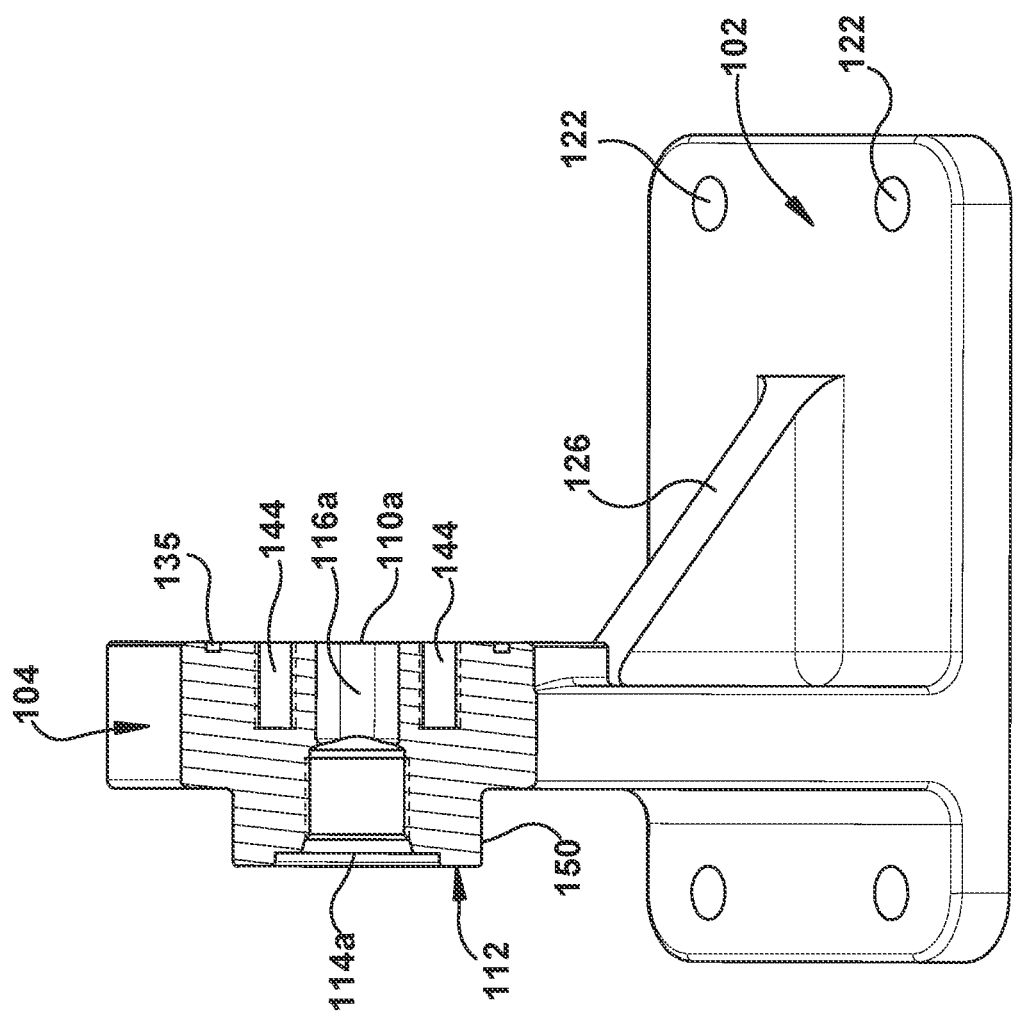
FIG. 14 shows a cross-sectional view taken about the line C-C in FIG. 11.

Referring particularly to FIGS. 11-13, the internal fluid passages 116a, 116b of the mounting manifold 130 are shown in further detail. As shown, the internal fluid passages 116a, 116b fluidly connect the pump interface ports 110a, 110b with the motor interface ports 114a, 114b. In the illustrated embodiment, the motor interface ports 114a, 114b are directly opposite the pump interface ports 110a, 110b which provides a relatively short and straight fluid flow path through the fluid interface section 104 of the mounting manifold 30. Such a simplified construction of the internal passages 116a, 116b may minimize flow perturbations through the mounting manifold 30. Such a simplified construction of the internal passages 116a, 116b also may make the mounting manifold 30 easier to fabricate from traditional manufacturing techniques, such as sand-casting.

In exemplary embodiments, the mounting manifold 30 has a unitary body formed by the mounting section 102 and the fluid interface section 104, which may improve the ease of manufacture of the mounting manifold 30, particularly with traditional sand-casting techniques. The mounting manifold 30 also may be configured to minimize weight and thereby costs. For example, the mounting manifold 30 may have a rounded top of the fluid interface section 104 that may generally contour to the cylindrical shape of the pump porting manifold 46, such that the mounting manifold 30 has a generally U-shaped configuration when viewing from the front. The lower portion of the fluid interface section 104 may be formed to have a relatively thin cross-section between its front and rear sides, both of which may be generally planar vertical surfaces. Because this portion of the fluid interface section 104 may be configured to minimize cross-sectional thickness, the support portion 126 may be provided to bolster support. In addition, both the pump interface 108 and the motor interface 112 of the mounting manifold 36 may have thicker regions than the lower region of the fluid interface section 104 to accommodate the length of the fasteners 148 and/or fluid conduit connectors 94a, 94b as described above.

Generally, the mounting manifold 30 provides a relatively simple and cost-effective construction with short and relatively simple internal fluid passages that fluidly connect the pump 26 to the motor 28. Furthermore, such a hydraulic transmission subassembly provided by mounting manifold 30 in combination with the pump 26 may allow for enhanced modularity by providing a way to mount the pump 26 on the mower, while enabling use of many different hydraulic motor designs simply via connection with the fluid conduits 39a, 39b. Generally, the configuration of the mounting manifold 30 provides for an overall modular design, allowing easy assembly and removal of the various parts. This results in maintenance activities being less complicated and time consuming. Such a solution provided by the mounting manifold 30 also enables users to use the pump 26 without the need to add a separate filter and reservoir, as these components are already integrated into the transmission pump 26 design. The mounting manifold 30 also may provide mower manufacturers the flexibility in chassis design to place the motor 28 in various proximities to the pump 26 as desired.

Accordingly, another aspect of the present disclosure provides a method of assembling a hydrostatic transmission with a mounting manifold 30, a pump assembly 26, and a motor 28. Such method may include mounting the pump assembly 26 to the mounting manifold 30, which before or after this may include mounting the manifold assembly 30 to a portion of the mower, such as the frame or chassis. The hydraulic motor 28 may be mounted separately and distinct from the mounting manifold 30 and pump assembly 26. The fluid conduit(s) 39a, 39b may be fluidly connected to both the motor 28 and the mounting manifold 30 to provide a fluid connection between the pump 26 and the motor 28 via the mounting manifold 30 and conduit(s) 39a, 39b. These steps may be carried out in any order as may be desirable depending on the particular application, as would be understood by those having ordinary skill in the art. An exemplary method of modularly assembling a hydrostatic transmission also may include providing a plurality of hydraulic motors, in which at least some of the plurality of hydraulic motors are different, except that each different motor includes the same mounting manifold 30 and pump assembly 26 to enable fluid communication between these components.

Figure 15:
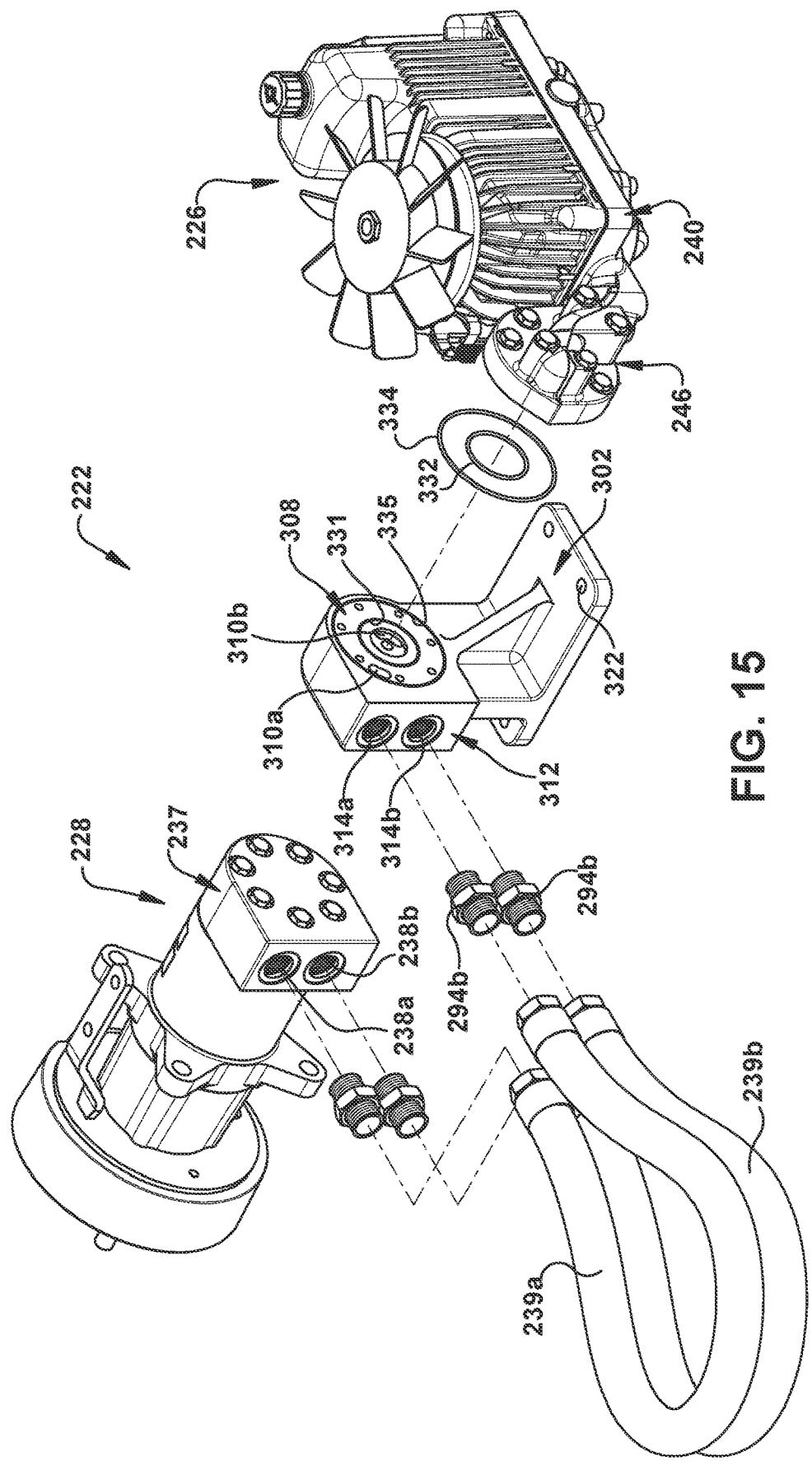
FIG. 15 shows an exploded perspective view of another exemplary embodiment of a hydrostatic transmission according to an embodiment of the present disclosure.
Figure 16:
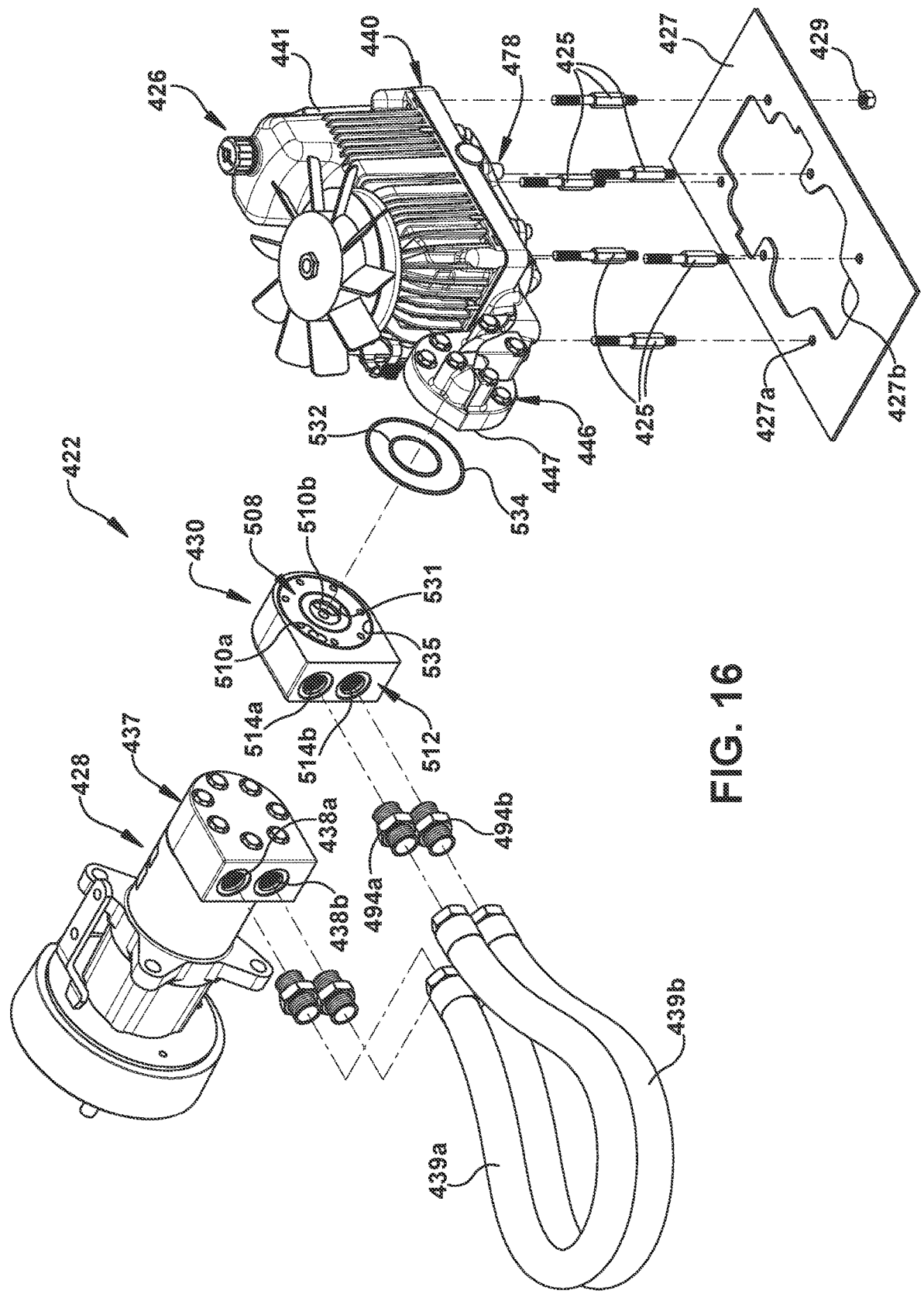
FIG. 16 shows an exploded perspective view of another exemplary embodiment of a hydrostatic transmission according to an embodiment of the present disclosure.
Figure 17:
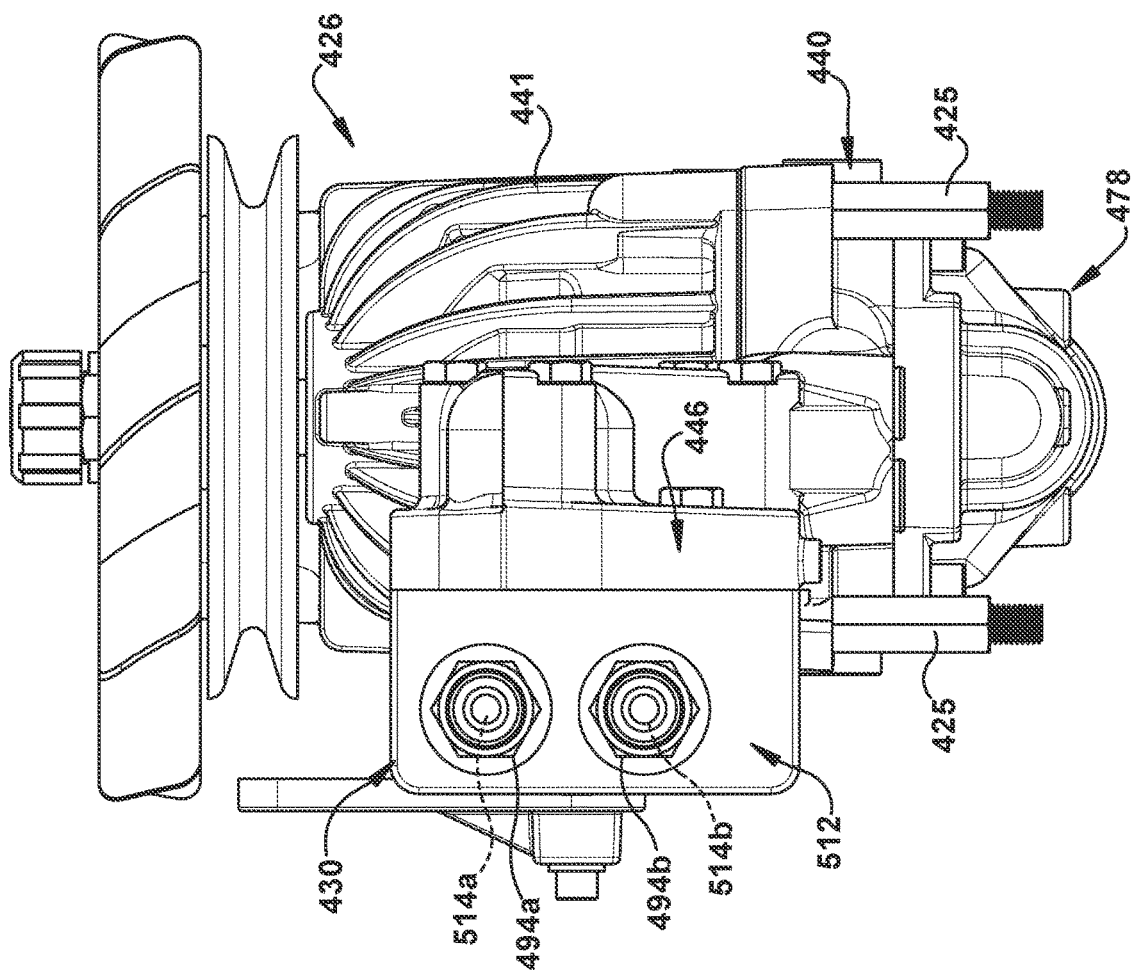
FIG. 17 is a right side elevation view of an exemplary hydraulic pump assembly and exemplary adapter manifold of the hydrostatic transmission shown in FIG. 16.
Figure 18:
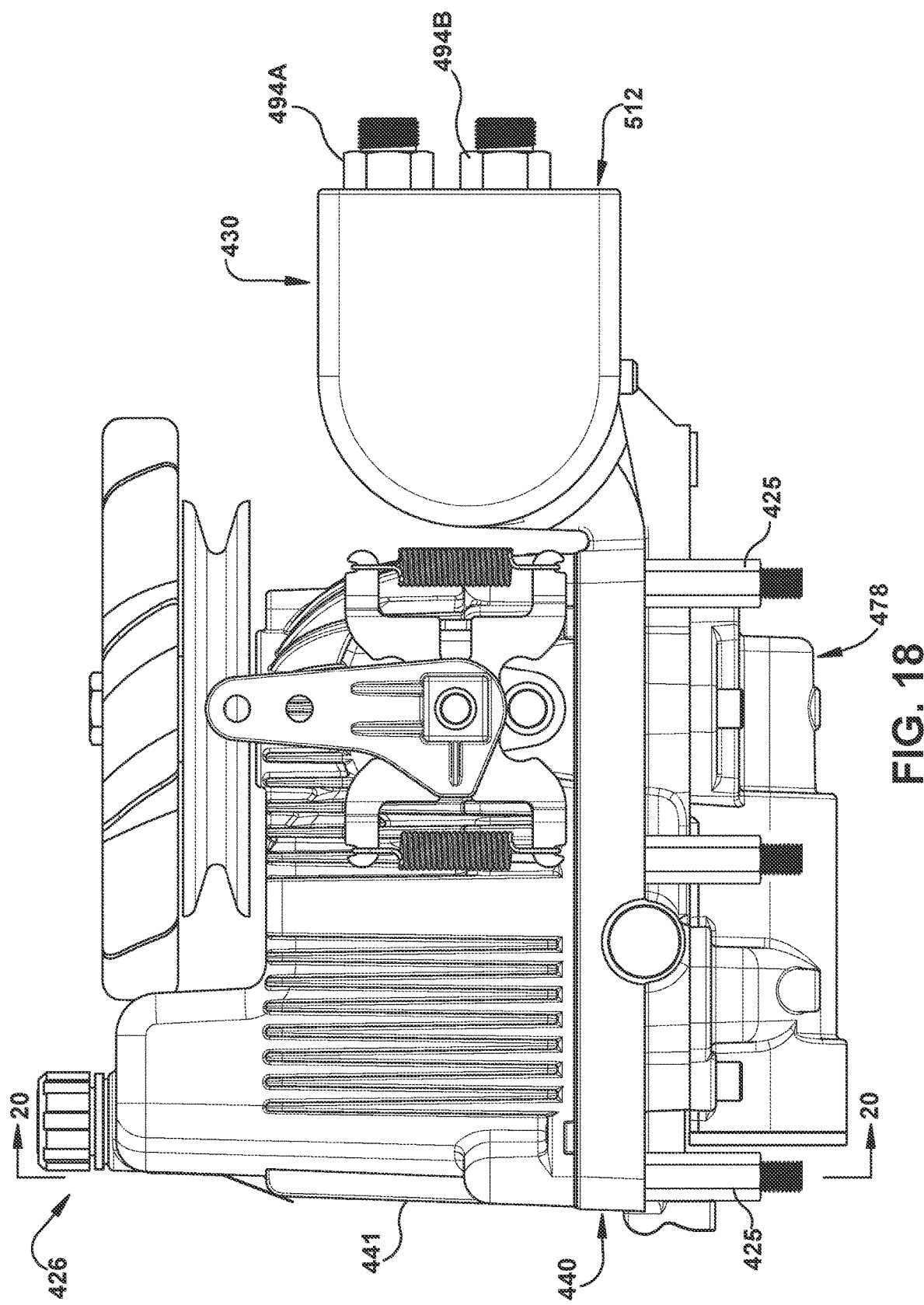
FIG. 18 is a front elevation view of the pump assembly and adapter manifold in FIG. 17.
Figure 19:
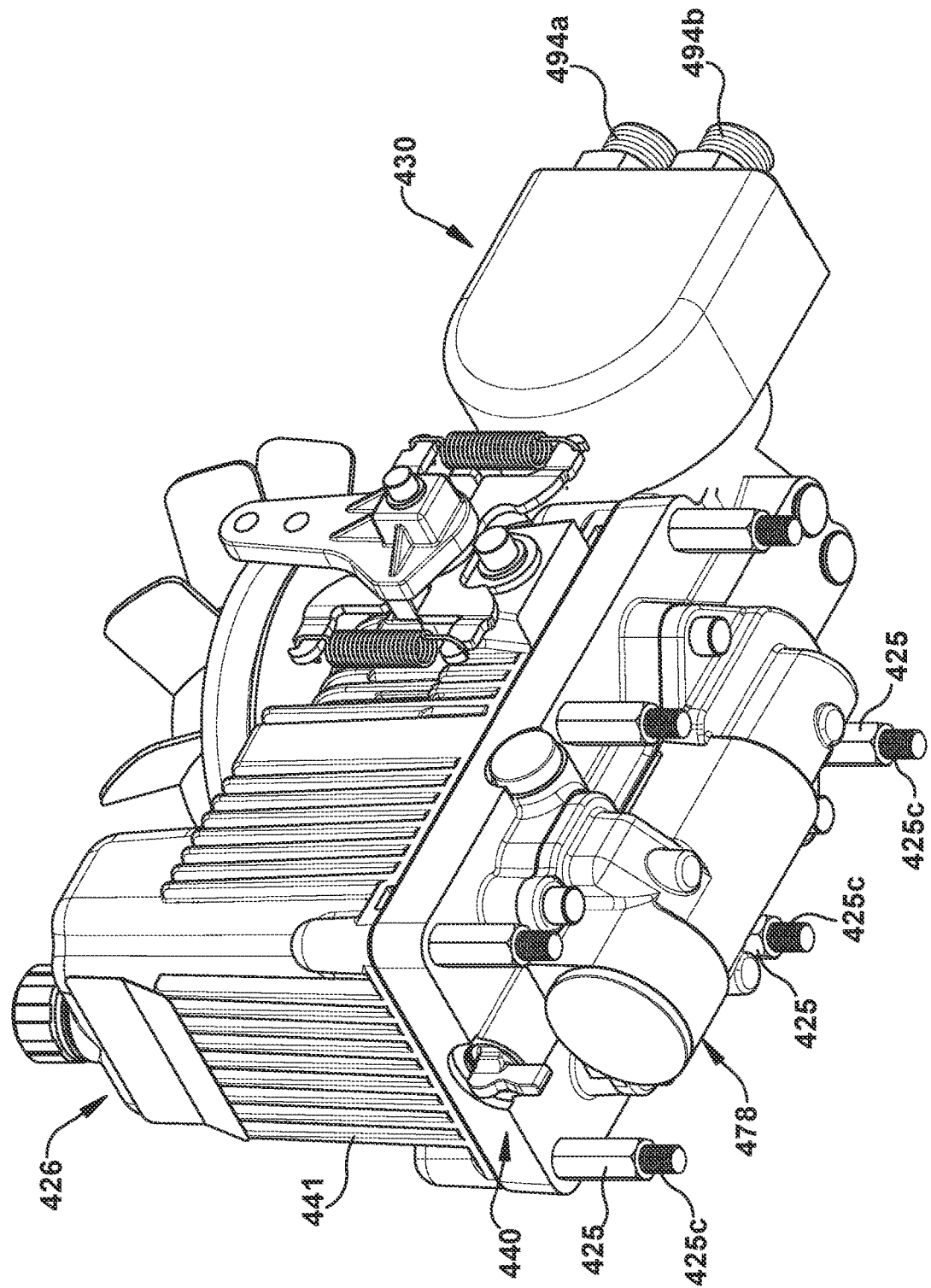
FIG. 19 is a bottom, front, left perspective view of the pump assembly and adapter manifold in FIG. 17.

Turning to FIG. 15, another exemplary embodiment of a hydrostatic transmission 222 is shown. The hydrostatic transmission 222 is substantially the same as the above-referenced hydrostatic transmission 22, and consequently the same reference numerals but indexed by 200 are used to denote structures corresponding to similar structures in the hydrostatic transmissions 22, 222. In addition, the foregoing description of the hydrostatic transmission 22 is equally applicable to the hydrostatic transmission 222, except as noted below. Moreover, it is understood that aspects of the hydrostatic transmissions may be substituted for one another or used in conjunction with one another where applicable.

In the illustrated embodiment, the motor interface 312 of the mounting manifold 230 is on a side of mounting manifold 230, instead of directly opposite the pump interface 308 as is the case with the mounting manifold 30. Similarly to mounting manifold 30, the mounting manifold 230 includes motor interface ports 314a, 314b that are configured to fluidly connect with the motor 228 via fluid conduits 239a, 239b, such as with suitable connectors 294a, 294b (e.g., fittings), which may be threaded into inward threads of the ports 314a, 314b. Because the motor interface ports 314a, 314b are on the side, the internal fluid passages (hidden from view) that fluidly connect the pump interface ports 310a, 310b with the motor interface ports 314a, 314b turn ninety degrees in the illustrated embodiment. Such a configuration with the ports 314a, 314b on the side may provide space saving features and/or facilitate improved routing of conduits 239a, 239b in some applications.

In exemplary embodiments, the hydraulic motor assembly 228 may be substantially the same as hydraulic motor 28. As shown, fluid manifold 237 of the motor assembly 228 may be provided including motor ports 238a and 238b, which in the illustrated embodiment are fluidly connected to the mounting manifold 230 via the fluid conduits 239a, 239b and motor interface ports 314a, 314b to provide flow of hydraulic fluid between the pump 226 and motor 228.

Turning now to FIGS. 16-20, another exemplary embodiment of a hydrostatic transmission 422 is shown. The hydrostatic transmission 422 is similar to the above-referenced hydrostatic transmission 22 and consequently the same reference numerals but indexed by 400 are used to denote structures corresponding to similar structures in the hydrostatic transmissions 22, 422. In addition, the foregoing description of the hydrostatic transmission 22 is equally applicable to the hydrostatic transmission 422, except as noted below. Moreover, it is understood that aspects of the hydrostatic transmissions 22, 222, 422 may be substituted for one another or used in conjunction with one another where applicable.

As shown, the hydrostatic transmission 422 generally includes a hydraulic pump assembly 426, a hydraulic motor assembly 428, and an adapter manifold 430 that is discrete with respect to each of the pump assembly 126 and the motor assembly 128. In the illustrated embodiment, the adapter manifold 430 manifold enables the pump assembly 426 to be mounted and self-supported on the vehicle separately from the motor assembly 428, and which the adapter manifold 430 provides a fluid connection between the transmission pump 426 and separately mounted hydraulic motor 428. As shown, the pump assembly 426 may be mounted to the vehicle via mounting studs 425, which may be directly coupled to a part of the vehicle (e.g., frame or similar structure) or may be coupled to the vehicle via a separate mounting structure 427, as shown.

Similarly to mounting manifold 30, the adapter manifold 430 includes a pump interface 508 with pump interface porting, such as pump interface ports 510a, 510b. The adapter manifold 430 also includes a motor interface section 512 having motor interface porting, such as motor interface ports 514a, 514b that align with and fluidly connect with the corresponding pump ports (hidden from view) of the porting manifold 446 of the pump assembly 426. As shown, the configuration of the pump interface 508 including the location of the pump interface ports 410a, 410b in addition to the location of seals 532, 534 in seal grooves 531, 535 are the same as that described above for mounting manifold 30.

As shown in the illustrated embodiment, the motor interface 512 of the adapter manifold 530 is on a side of manifold 530, instead of directly opposite the pump interface 508 as is the case with the mounting manifold 30. Similarly to mounting manifold 30, the adapter manifold 530 includes motor interface ports 514a, 514b that are configured to fluidly connect with the motor 428 via fluid conduits 439a, 439b, such as with suitable connectors 494a, 494b (e.g., fittings), which may be threaded into inward threads of the ports 514a, 514b. Because the motor interface ports 514a, 514b are on the side, the internal fluid passages (hidden from view) that fluidly connect the pump interface ports 510a, 510b with the motor interface ports 514a, 514b turn ninety degrees in the illustrated embodiment.

In exemplary embodiments, the hydraulic motor assembly 428 is substantially the same as hydraulic motor 28. As shown, a fluid manifold section 437 of the motor assembly 428 may be provided including motor ports 438a and 438b, which in the illustrated embodiment are fluidly connected to the adapter manifold 430 via the one or more fluid conduits 439a, 439b and motor interface ports 514a, 514b to provide flow of hydraulic fluid between the pump 426 and motor 428.

Figure 20:
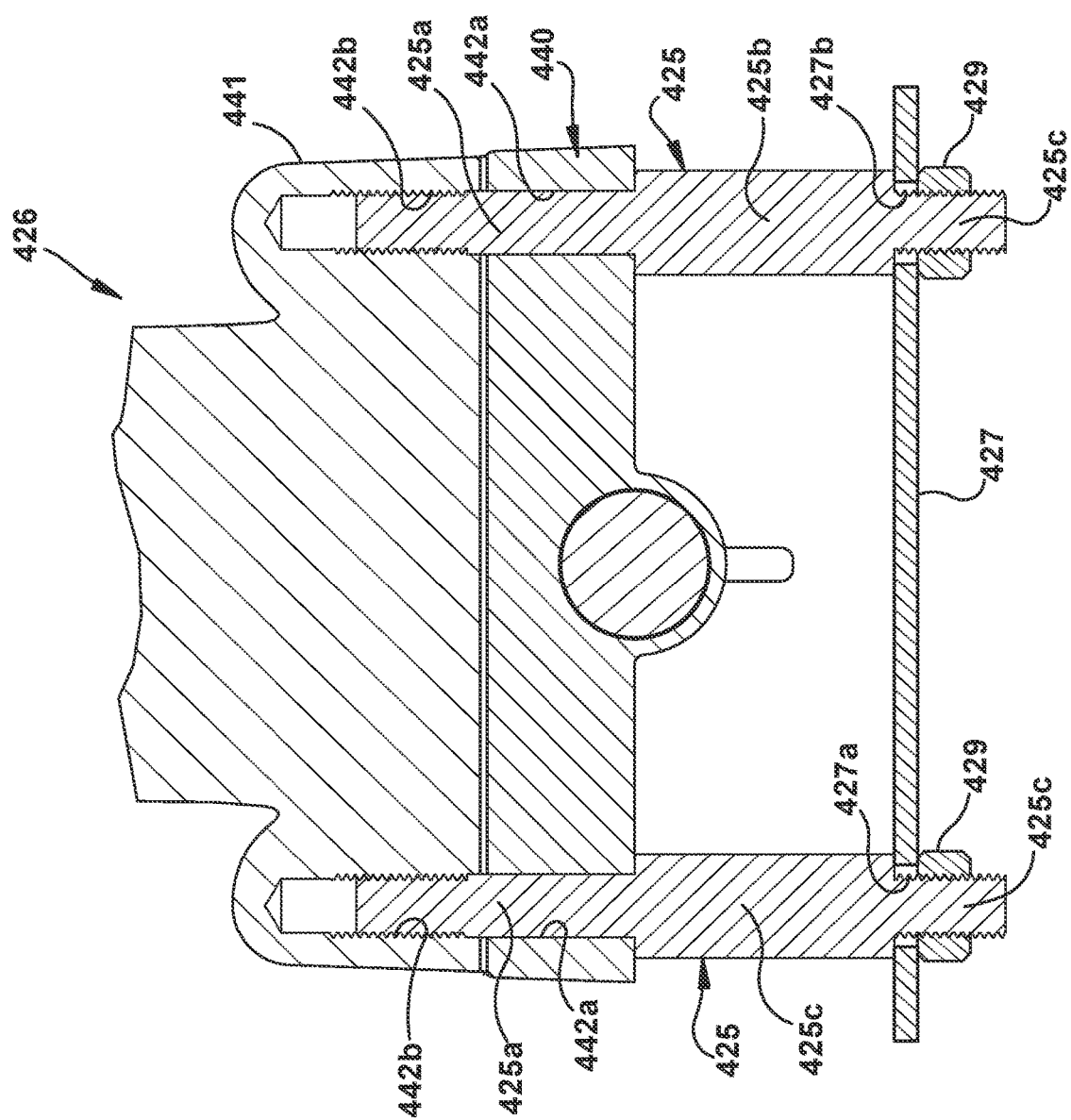
FIG. 20 is a cross-sectional view taken about the line 20-20 in FIG. 18.

In exemplary embodiments, the hydraulic pump assembly 426 is substantially the same as the hydraulic pump assembly 26, and includes a top housing 441 and an endblock subassembly 440 coupled to the top housing 441. Similarly to the pump assembly 26, the endblock 440 of the pump assembly 426 includes a pump interfacing section (hidden from view) and a porting manifold 446 having a pump porting interface 447 that interfaces with the adapter manifold 430. The porting manifold 446 includes suitable porting (hidden from view) and one or more internal passages (hidden from view) for communicating hydraulic fluid between the hydraulic pump 426 and the hydraulic motor 428 via the adapter manifold 430. As shown, the endblock subassembly 440 may support a charge pump/filter housing assembly 478, which is coupled to a bottom portion of the endblock subassembly 440 in the illustrated embodiment. Similarly to the pump assembly 26, the pump assembly 426 provides the top housing 441 coupled to the endblock 440 such that the top housing and endblock cooperate to form a reservoir for the hydraulic fluid, and also form an enclosure for the hydraulic pump 426. As best shown in FIG. 20, the endblock subassembly 440 and/or top housing 441 include housing fastening receivers 442a and/or 442b, such as threaded bores, that receive housing fasteners 425 to secure the top housing 441 to the endblock 440. In the illustrated embodiment, the housing fasteners 425 are configured as mounting studs 425 having a narrower threaded section 425a and a wider shank section 425b that forms an extension for supporting the pump assembly 426 on the mounting structure 427 (e.g., mounting plate). As shown, the mounting studs 425 may have narrow end portion 425c for being received through receivers 427a (e.g., holes) in the mounting structure 427. To secure the mounting studs 425 to the mounting structure 427, fastening elements 429 (such as nuts) may be secured to the end portions 425c of the mounting studs 425 (such as via threads on the end portions 425c). As shown, the mounting structure 427 may include a hole 427b to enable portions of the pump assembly 426 (e.g., charge filter assembly 478) to extend therethrough. Such configuration(s) enables the pump assembly 426 to be mounted to the vehicle in a self-supported manner, and which provides mounting studs 425 for such mounting support that are also integrated into the pump assembly 426 for securing the endblock 440 and top cover 441 together.

While a preferred form or forms of an exemplary mounting manifold 30, hydraulic motor assembly 28, hydraulic pump assembly 32, and/or vehicle 10 have been described above, it is understood that other mounting manifold, hydraulic motor assembly, hydraulic pump assembly, and/or vehicle designs could also be used in accordance with the present disclosure. As such, the principles and aspects of the present invention are not limited to any particular mounting manifold, hydraulic motor assembly, hydraulic pump assembly, and/or vehicle designs, but rather is appropriate for a wide variety of such designs.

According to an aspect of the present disclosure, a hydrostatic transmission subassembly for a vehicle includes: a hydraulic pump assembly having: a pump housing, and a pump porting manifold including a pump porting interface having pump porting for communicating fluid to and from the hydraulic pump assembly; and a mounting manifold having: a mounting section adapted for mounting to the vehicle; a fluid interface section extending from the mounting section, the fluid interface section including a pump interface having pump interface porting, and a motor interface having motor interface porting; and one or more fluid passages extending between the pump interface porting and the motor interface porting for communicating fluid therebetween; wherein the pump interface of the mounting manifold engages with the pump porting interface of the pump porting manifold, such that the pump interface porting is fluidly connected to the pump porting; and wherein, when the mounting manifold is mounted to the vehicle via the mounting section, the mounting manifold supports the hydraulic pump assembly.

According to another aspect, a hydrostatic transmission subassembly for a vehicle includes: a hydraulic pump assembly having: a pump housing including a top housing cover and an endblock coupled to a bottom of the top housing cover, and a pump porting manifold extending from the endblock, the pump porting manifold including a pump porting interface having pump porting for communicating fluid to and from the hydraulic pump assembly; and an adapter manifold connected to the pump porting manifold, the adapter manifold having: a pump interface section having pump interface porting, the pump interface section engaging with the pump porting interface of the pump porting manifold, such that the pump interface porting is fluidly connected to the pump porting; a motor interface section having motor interface porting for being fluidly connected to a hydraulic motor; and one or more fluid passages extending between the pump interface porting and the motor interface porting for communicating fluid between the hydraulic pump assembly and the hydraulic motor; wherein the endblock of the hydraulic pump assembly includes integrated mounting studs that are configured to secure the endblock to the top housing cover, and wherein the mounting studs are configured to support the hydraulic pump assembly on the vehicle.

According to another aspect, a mounting manifold for use in a hydrostatic transmission of a vehicle includes: a mounting section having fastening receivers and a mounting interface for mounting the mounting manifold to the vehicle; and a fluid interface section extending from the mounting section; the fluid interface section including a pump interface having first and second interface ports, a motor interface having first and second motor interface ports, and first and second fluid passages respectively fluidly connecting the first and second motor interface ports to the respective first and second pump interface ports; the pump interface having a first face groove and a first seal disposed in the first face groove, the first face groove and first seal being configured to fluidly separate the first pump interface port from the second pump interface port when in use; the pump interface having a second face groove and a second seal disposed in the second face groove for enabling sealing engagement with a pump porting interface of a hydraulic pump assembly of the hydrostatic transmission; and wherein the mounting manifold includes a plurality of fastening receivers that are configured to receive corresponding fasteners for mounting the hydraulic pump assembly to the mounting manifold, the mounting manifold being configured such that, when mounted to the vehicle, the mounting manifold supports the hydraulic pump assembly.

Embodiments according to the present disclosure may include one or more of the following additional features, separately or in any combination, with any of the foregoing aspect(s).

In some embodiments, the pump interface porting includes a first pump interface port and a second pump interface port, and wherein the pump interface includes a face groove and a seal disposed in the face groove, the face groove and seal being arranged to fluidly separate the first pump interface port from the second pump interface port.

In some embodiments, the second pump interface port is at a radially inward location relative to the first pump interface port, which corresponds with the location of the pump ports of the porting manifold.

In some embodiments, the face groove and the seal are a first face groove and first seal, the pump interface further including a second face groove and a second seal.

In some embodiments, the first face groove and the first seal radially outwardly surround the second pump interface port, and are located radially inwardly of the first pump interface port to provide fluid separation between the first and second pump interface ports.

In some embodiments, the second face groove and the second seal are located radially outwardly of the first pump interface port to prevent fluid from escaping outwardly of the pump interface.

In some embodiments, the first pump interface port is a high-pressure supply port that is configured to communicate high-pressure fluid from the hydraulic pump assembly to a hydraulic motor when the vehicle is operating in a forward direction; and wherein the second pump interface port is a low-pressure return port that is configured to communicate low-pressure return fluid from the hydraulic motor to the hydraulic pump assembly when the vehicle is operating in the forward direction.

In some embodiments, the pump porting manifold and the mounting manifold each include fastening receivers that receive corresponding fasteners to mountingly secure the hydraulic pump assembly to the mounting manifold, and wherein the fastening receivers of the mounting manifold are configured as threaded bores that threadably receive the fasteners.

In some embodiments, the motor interface porting includes threads for threadably receiving fluid conduit for fluidly coupling the mounting manifold to a hydraulic motor.

In some embodiments, motor interface porting is directly opposite the pump interface porting such that the internal fluid passage is straight.

In some embodiments, the mounting manifold has a unitary body formed by the mounting section and the fluid interface section.

In some embodiments, the mounting section includes a plurality of fastener receivers for receiving corresponding fasteners to mount the mounting manifold to the vehicle.

In some embodiments, the hydraulic pump further includes an endblock connected to the pump housing such that the pump housing and endblock form a reservoir for hydraulic fluid, the endblock having the porting manifold extending therefrom.

In some embodiments, the endblock and pump housing form an enclosure for a piston rotating group of the hydraulic pump, and wherein the endblock includes a pump running face and the piston rotating group is configured to rotate against the pump running face.

In some embodiments, the porting manifold includes internal flow passages between pump kidney ports opening through a pump running face and the pump porting opening through the pump porting interface, wherein the porting manifold extends from the endblock such that the pump porting is raised in elevation relative to the pump kidney ports, and wherein the fluid interface section extends upright in the vertical direction from the mounting section.

In some embodiments, the hydrostatic transmission subassembly further includes a charge pump and filter assembly that comprises a charge pump and filter housing that houses a charge pump and a filter, wherein a top portion of the charge pump and filter housing abuts a bottom portion of the endblock.

In some embodiments, the hydraulic pump comprises: an input shaft; a piston rotating group; and a moveable swash plate; wherein the input shaft drives the piston rotating group such that pistons of the rotating group extend and contract against the swash plate to pump the hydraulic fluid.

According to another aspect, a hydrostatic transmission includes: the hydrostatic transmission subassembly according to any of the foregoing; a hydraulic motor mounted on a different portion of the vehicle separately from the mounting manifold; and fluid conduits fluidly connecting motor ports of the hydraulic motor to the motor interface porting of the mounting manifold.

According to another aspect, a vehicle, such as a mower, includes: a frame; and the hydrostatic transmission subassembly or hydrostatic transmission according to any of the foregoing.

According to another aspect of the present disclosure, a method of assembling a hydrostatic transmission to a vehicle includes: (i) mounting a hydraulic pump assembly to a mounting manifold, wherein: the hydraulic pump assembly includes a pump housing, and a porting manifold including a pump porting interface having pump porting for communicating fluid to and from the hydraulic pump; and the mounting manifold includes: a mounting section adapted for mounting to the vehicle; a fluid interface section extending from the mounting section, the fluid interface section including a pump interface having pump interface porting, and a motor interface having motor interface porting; and one or more fluid passages extending between the pump interface porting and the motor interface porting for communicating fluid therebetween; the pump interface of the mounting manifold engages with the pump porting interface of the pump porting manifold, such that the pump interface porting is fluidly connected to the pump porting; and (ii) mounting the mounting manifold to the vehicle via the mounting section, such that the mounting manifold supports the hydraulic pump assembly.

According to another aspect of the present disclosure, the method may further include: (iii) mounting a hydraulic motor to a different portion of the vehicle separate from mounting manifold; and (iv) fluidly connecting the hydraulic motor to the motor interface porting of the mounting manifold via one or more fluid conduits.

It is understood that positional terms such as "top," "bottom," "upper," "lower," "left," "right," "front," "rear," "horizontal," "vertical," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference depending on the transmission configuration, as understood by those having ordinary skill in the art.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission subassembly for a vehicle, comprising:
   a hydraulic pump assembly having:
      a pump housing, and
      a pump porting manifold including a pump porting interface having pump porting for communicating fluid to and from the hydraulic pump assembly; and
   a mounting manifold having:
      a mounting section adapted for mounting to the vehicle;
      a fluid interface section extending from the mounting section, the fluid interface section including a pump interface having pump interface porting, and a motor interface having motor interface porting; and
      one or more fluid passages extending between the pump interface porting and the motor interface porting for communicating fluid therebetween;
   wherein the pump interface of the mounting manifold engages with the pump porting interface of the pump porting manifold, such that the pump interface porting is fluidly connected to the pump porting;
   wherein, when the mounting manifold is mounted to the vehicle via the mounting section, the mounting manifold supports the hydraulic pump assembly;
   wherein the pump interface porting includes a first pump interface port and a second pump interface port, and
   wherein the pump interface includes a face groove and a seal disposed in the face groove, the face groove and seal being arranged to fluidly separate the first pump interface port from the second pump interface port.

2. The subassembly according to claim 1, wherein the second pump interface port is at a radially inward location relative to the first pump interface port, which corresponds with the location of the pump ports of the porting manifold.

3. The subassembly according to claim 1, wherein the face groove and the seal are a first face groove and first seal, the pump interface further including a second face groove and a second seal,
   wherein the first face groove and the first seal radially outwardly surround the second pump interface port, and are located radially inwardly of the first pump interface port to provide fluid separation between the first and second pump interface ports, and
   wherein the second face groove and the second seal are located radially outwardly of the first pump interface port to prevent fluid from escaping outwardly of the pump interface.

4. The subassembly according to claim 1, wherein the first pump interface port is a high-pressure supply port that is configured to communicate high-pressure fluid from the hydraulic pump assembly to a hydraulic motor when the vehicle is operating in a forward direction; and wherein the second pump interface port is a low-pressure return port that is configured to communicate low-pressure return fluid from the hydraulic motor to the hydraulic pump assembly when the vehicle is operating in the forward direction.

5. The subassembly according to claim 1, wherein the pump porting manifold and the mounting manifold each include fastening receivers that receive corresponding fasteners to mountingly secure the hydraulic pump assembly to the mounting manifold, and
   wherein the fastening receivers of the mounting manifold are configured as threaded bores that threadably receive the fasteners.

6. The subassembly according to claim 1, wherein the motor interface porting includes threads for threadably receiving fluid conduit for fluidly coupling the mounting manifold to a hydraulic motor.

7. The subassembly according to claim 1, wherein the mounting manifold has a unitary body formed by the mounting section and the fluid interface section.

8. The subassembly according to claim 1, wherein the mounting section includes a plurality of fastener receivers for receiving corresponding fasteners to mount the mounting manifold to the vehicle.

9. The subassembly according to claim 1, wherein the hydraulic pump comprises: an input shaft; a piston rotating group; and a moveable swash plate; wherein the input shaft drives the piston rotating group such that pistons of the rotating group extend and contract against the swash plate to pump the hydraulic fluid.

10. A hydrostatic transmission, comprising:
    the hydrostatic transmission subassembly according to claim 1;
    a hydraulic motor mounted on a different portion of the vehicle separately from the mounting manifold; and
    fluid conduits fluidly connecting motor ports of the hydraulic motor to the motor interface porting of the mounting manifold.

11. A method of assembling the hydrostatic transmission according to claim 10 to a vehicle, comprising:
    (i) mounting a hydraulic pump assembly to a mounting manifold, wherein:
       the hydraulic pump assembly includes a pump housing, and a porting manifold including a pump porting interface having pump porting for communicating fluid to and from the hydraulic pump; and
       the mounting manifold includes: a mounting section adapted for mounting to the vehicle; a fluid interface section extending from the mounting section, the fluid interface section including a pump interface having pump interface porting, and a motor interface having motor interface porting; and one or more fluid passages extending between the pump interface porting and the motor interface porting for communicating fluid there between;
       the pump interface of the mounting manifold engages with the pump porting interface of the pump porting manifold, such that the pump interface porting is fluidly connected to the pump porting; and
    (ii) mounting the mounting manifold to the vehicle via the mounting section, such that the mounting manifold supports the hydraulic pump assembly.

12. A vehicle comprising:
    a frame; and
    the hydrostatic transmission subassembly according to claim 1.

13. A hydrostatic transmission subassembly for a vehicle, comprising:
    a hydraulic pump assembly having:
       a pump housing, and
       a pump porting manifold including a pump porting interface having pump porting for communicating fluid to and from the hydraulic pump assembly; and
    a mounting manifold having:
       a mounting section adapted for mounting to the vehicle;
       a fluid interface section extending from the mounting section, the fluid interface section including a pump interface having pump interface porting, and a motor interface having motor interface porting; and
       one or more fluid passages extending between the pump interface porting and the motor interface porting for communicating fluid therebetween;

wherein the pump interface of the mounting manifold engages with the pump porting interface of the pump porting manifold, such that the pump interface porting is fluidly connected to the pump porting;

wherein, when the mounting manifold is mounted to the vehicle via the mounting section, the mounting manifold supports the hydraulic pump assembly; and wherein motor interface porting is directly opposite the pump interface porting such that the internal fluid passage is straight.

14. A hydraulic transmission subassembly for a vehicle, comprising:
  a hydraulic pump assembly having:
    a pump housing, and
    a pump porting manifold including a pump porting interface having pump porting for communicating fluid to and from the hydraulic pump assembly; and
  a mounting manifold having:
    a mounting section adapted for mounting to the vehicle;
    a fluid interface section extending from the mounting section, the fluid interface section including a pump interface having pump interface porting, and a motor interface having motor interface porting; and
    one or more fluid passages extending between the pump interface porting and the motor interface porting for communicating fluid therebetween;
  wherein the pump interface of the mounting manifold engages with the pump porting interface of the pump porting manifold, such that the pump interface porting is fluidly connected to the pump porting;
  wherein, when the mounting manifold is mounted to the vehicle via the mounting section, the mounting manifold supports the hydraulic pump assembly; and
  wherein the hydraulic pump further includes an endblock connected to the pump housing such that the pump housing and endblock form a reservoir for hydraulic fluid, the endblock having the porting manifold extending therefrom.

15. The subassembly according to claim 14, wherein the endblock and pump housing form an enclosure for a piston rotating group of the hydraulic pump, and
  wherein the endblock includes a pump running face and the piston rotating group is configured to rotate against the pump running face.

16. The subassembly according to claim 14,
  wherein the porting manifold includes internal flow passages between pump kidney ports opening through a pump running face and the pump porting opening through the pump porting interface,
  wherein the porting manifold extends from the endblock such that the pump porting is raised in elevation relative to the pump kidney ports, and
  wherein the fluid interface section extends upright in the vertical direction from the mounting section.

17. The subassembly according to claim 14, further including a charge pump and filter assembly that comprises a charge pump and filter housing that houses a charge pump and a filter, wherein a top portion of the charge pump and filter housing abuts a bottom portion of the endblock.

18. A mounting manifold for use in a hydrostatic transmission of a vehicle, the mounting manifold comprising:
  a mounting section having fastening receivers and a mounting interface for mounting the mounting manifold to the vehicle; and
  a fluid interface section extending from the mounting section;
  the fluid interface section including a pump interface having first and second interface ports, a motor interface having first and second motor interface ports, and first and second fluid passages respectively fluidly connecting the first and second motor interface ports to the respective first and second pump interface ports;
  the pump interface having a first face groove and a first seal disposed in the first face groove, the first face groove and first seal being configured to fluidly separate the first pump interface port from the second pump interface port when in use;
  the pump interface having a second face groove and a second seal disposed in the second face groove for enabling sealing engagement with a pump porting interface of a hydraulic pump assembly of the hydrostatic transmission; and
  wherein the mounting manifold includes a plurality of fastening receivers that are configured to receive corresponding fasteners for mounting the hydraulic pump assembly to the mounting manifold, the mounting manifold being configured such that, when mounted to the vehicle, the mounting manifold supports the hydraulic pump assembly.

19. A hydrostatic transmission subassembly for a vehicle, comprising:
  a hydraulic pump assembly having:
    a pump housing including a top housing cover and an endblock coupled to a bottom of the top housing cover, and
    a pump porting manifold extending from the endblock, the pump porting manifold including a pump porting interface having pump porting for communicating fluid to and from the hydraulic pump assembly; and
  an adapter manifold connected to the pump porting manifold, the adapter manifold having:
    a pump interface section having pump interface porting, the pump interface section engaging with the pump porting interface of the pump porting manifold, such that the pump interface porting is fluidly connected to the pump porting;
    a motor interface section having motor interface porting for being fluidly connected to a hydraulic motor; and
    one or more fluid passages extending between the pump interface porting and the motor interface porting for communicating fluid between the hydraulic pump assembly and the hydraulic motor;
  wherein the endblock of the hydraulic pump assembly includes integrated mounting studs that are configured to secure the endblock to the top housing cover, and wherein the mounting studs are configured to support the hydraulic pump assembly on the vehicle.

* * * * *